(12) United States Patent
Olshansky et al.

(10) Patent No.: US 7,239,629 B1
(45) Date of Patent: Jul. 3, 2007

(54) MULTISERVICE NETWORK

(75) Inventors: Robert Olshansky, Wayland, MA (US);
Robert Israel, Westford, MA (US);
Elliot Eichen, Arlington, MA (US)

(73) Assignees: Verizon Corporate Services Group Inc., New York, NY (US); Level 3 Communications, Inc., Bloomfield, CO (US); BBN Technologies Corp, Cambridge, MA (US)

( * ) Notice: Subject to any disclaimer, the term of this patent is extended or adjusted under 35 U.S.C. 154(b) by 0 days.

(21) Appl. No.: 09/452,915

(22) Filed: Dec. 1, 1999

(51) Int. Cl.
*H04L 12/66* (2006.01)
*H04L 12/28* (2006.01)
*H04L 12/56* (2006.01)

(52) U.S. Cl. .................. 370/353; 370/354; 370/401

(58) Field of Classification Search ........ 370/351–356, 370/410, 522, 524, 401, 419, 420, 463, 395.5, 370/395.52; 379/90.01; 709/238
See application file for complete search history.

(56) References Cited

U.S. PATENT DOCUMENTS

| | | | |
|---|---|---|---|
| 5,889,846 A * | 3/1999 | Ricciardi | .................. 379/219 |
| 6,091,709 A * | 7/2000 | Harrison et al. | ............ 370/235 |
| 6,222,824 B1 | 4/2001 | Marin et al. | |
| 6,304,565 B1 | 10/2001 | Ramamurthy | |
| 6,363,065 B1 * | 3/2002 | Thornton et al. | ........... 370/352 |
| 6,363,079 B1 * | 3/2002 | Barzegar et al. | ............ 370/465 |
| 6,363,424 B1 * | 3/2002 | Douglas et al. | ............. 709/224 |
| 6,385,178 B1 * | 5/2002 | Palvianen | ................... 370/328 |
| 6,519,249 B1 | 2/2003 | Bennefeld et al. | |
| 6,625,119 B1 | 9/2003 | Schuster et al. | |
| 6,795,867 B1 | 9/2004 | Ma et al. | |
| 7,027,814 B1 | 4/2006 | Koivupuro et al. | |

* cited by examiner

*Primary Examiner*—Chi Pham
*Assistant Examiner*—Ronald Abelson

(57) ABSTRACT

A multiservice network for delivering enhanced communication services to customer devices attached to either the PSTN, such as telephones and fax machines, or devices attached to the Internet or private data networks, such as PCs or other IP devices, is presented. Enhanced services include IP-based faxing, IP-based telephony, IP-based conferencing, Internet call waiting, messaging services, such as unified messaging, and other advanced services such as find-me-follow-me, and desktop telephony. The multiservice network may be managed by a configuration manager for Internet telephony (COMIT).

47 Claims, 6 Drawing Sheets

MULTISERVICE NETWORK

BACKGROUND OF THE INVENTION

1. Field of the Invention

This application relates to network designs for delivering communication services to customer devices, and more particularly to a multiservice network providing communication services.

2. Description of Related Art

Communication services today are generally based on either the public switched telephone network (PSTN), which provides circuit-switched voice services, real-time faxing and central office (CO)-based voice mail, or the Internet protocol (IP)-based Internet and Intranet, which provides services such as email.

The PSTN and the IP-based Internet and Intranets rely on different architectures and protocols. The PSTN refers to the collection of interconnected systems operated by the various telephone companies (telcos) and post telephone and telegraph administrations (PTTs) around the world. Although the PSTN was originally based on a human-operated analog circuit switching systems (plugboards), and progressed to include electromechanical switches, by now this has almost completely been made digital, except for the final connection to the subscriber (the "last mile"): The signal coming out of the phone set is analog. It is usually transmitted over a twisted pair cable as an analogue signal. At the telco office, this analogue signal is usually digitized, using 8000 samples per second and 8 bits per sample, yielding a 64 kb/s data stream (DS0). Several such data streams are usually combined into a fatter stream: in the US, 24 channels are combined into a T1 line, in Europe, 29 or 30 channels are combined into an E1 line. This can later be further combined into larger segments for transmission over high-bandwidth core trunks. At the receiving end, the channels are separated, the digital signals are converted back to analog and delivered to the received phone.

In IP-based wide-area networks, on the other hand, IP, transmission control protocol (TCP), and user datagram protocol (UDP) may be used to operate hardware and software data communication systems. These wide-area networks are usually constructed with serial lines, extending over distances greater than one kilometer. IP and TCP encompass both network layer and transport layer protocols to be used in such networks. UDP is a connectionless protocol which, like TCP, may be layered on top of IP. UDP neither guarantees delivery nor does it require a connection. As a result it is lightweight and efficient, but all error processing and retransmission may require care by an application program.

The PSTN and the IP-based wide-area networks are disparate systems relying on different designs and architectures. Melding the two systems together may require significant innovations and effort. There exists a commercial need for the design of a wide-area communication network offering services to the consumer, business and enterprise markets, which bridges communications across the PSTN, and IP-based Internets and Intranets.

SUMMARY OF THE INVENTION

In accordance with one aspect of the invention, a network design for delivering enhanced communication services to customer devices is presented. The devices may be attached to the public switched telephone network (PSTN), or the Internet or other IP networks. The PSTN includes telephones and fax machines. Enhanced services may involve IP-based faxing, telephony, and conferencing, as well as other services such as Internet call waiting, messaging services (e.g., unified messaging), find-me-follow-me, and desktop telephony.

In accordance with another aspect of the invention, a multiservice network is presented comprising a wide-area IP network, a public switched telephone network, a data center, and a configuration manager. The data center is connected to the public switched telephone network and the wise area IP network, and manages and provides services to the multiservice network. The configuration manager manages the multiservice network and includes a data model.

In accordance with yet another aspect of the invention is a data model stored in a computer memory. The data model includes at least one relation to the data model pertaining to a multiservice network, and attributes associated with each relation representing data for the multiservice network.

In accordance with yet another aspect of the invention is a method for managing a multiservice network. The method includes defining at least one relation included in a data model pertaining to the multservice network. Attributes are associated with at least one relation to represent data for the multiservice network. Information is downloaded from the data model to network elements of the multiservice network to manage the multiservice network.

In accordance with yet another aspect of the invention is a multiservice network. The multiservice network comprises a wide area IP network, a public switched telephone network, a point of presence, a data center, a signaling system, and a configuration manager.

In accordance with yet another aspect of the invention is a method for providing communication services over a multiservice network. A wide-area IP network is connected to a public switched telephone network by using at least one point-of-presence. A data center is connected to the public switched telephone network and the wide-area IP network. Services are provided to the multiservice network using the data center. A signaling system is provided. The multiservice network is managed using a configuration manager for Internet telephony.

In accordance with yet another aspect of the invention is a data model stored in a computer memory. The data model includes one or more entities and associated attributes used to represent items included in the multiservice network. One or more relationships between the one or more entities represent relationships between the items included in the multservice network.

BRIEF DESCRIPTION OF DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE PREFERRED EMBODIMENT(S)

Set forth below are elements that may be included in an embodiment of a multiservice network that may include both a PSTN and an IP-based system.

(1) Points-of Presence

Points-of-presence (PoPs) are the physical locations in the wide-area network which house equipment, primarily including IP-PSTN gateways which interface to the PSTN, and IP routers which interface to a wide-area IP network. The gateways and routers are interconnected by a LAN in the PoP, which may be a switched-Ethernet or fast Ethernet or gigabit Ethernet LAN.

Figure 1:
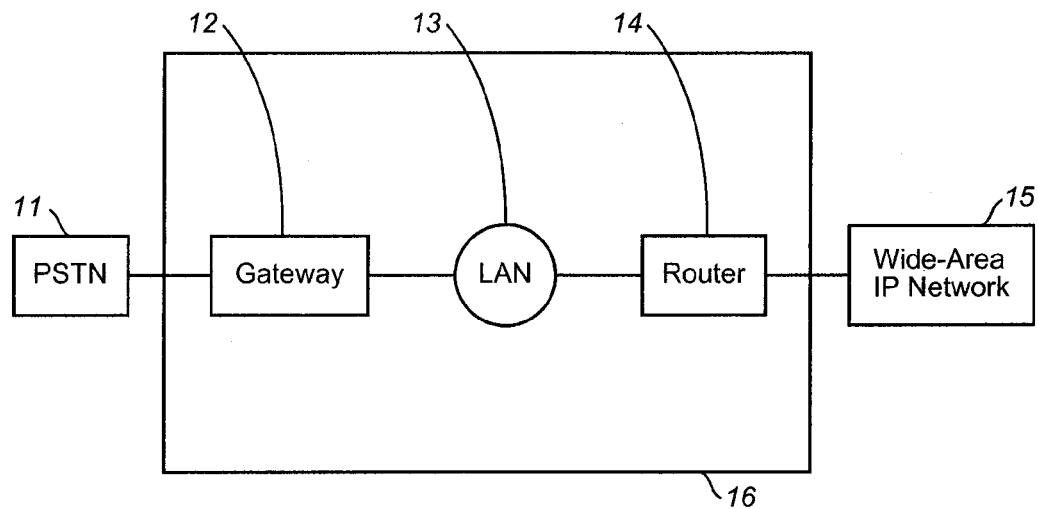
FIG. 1 schematically shows an example of an embodiment of a connection between the PSTN and the wide-area IP network employed in the multiservice network.

Referring to FIG. 1, an example of an embodiment of a connection between the PSTN and the wide-area network is shown. Included is a schematic of a PoP 16. A local area network (LAN) 13 connects a gateway 12 and a router 14. The LAN may be a data communications network which is geographically limited (typically to a 1 km radius) allowing easy interconnection of terminals, network elements, and computers within adjacent geographic locations. Because the network is known to cover only a small area, optimizations can be made in the network signal protocols that permit data rates up to 100 Mb/s. The gateway 12 and router 14 act as interfaces to the PSTN 11 and wide-area IP network 15, respectively. The router 14 may be a device which forwards packets between networks. The forwarding decision may be based on network layer information and routing tables, often constructed by routing protocols. In one embodiment, the gateway 12 may be a media gateway, such as an IP-PSTN gateway. The connection between the IP-PSTN gateway and the PSTN 11 is then realized by equipment known to those of ordinary skill in the art. For example, the connection may occur via a primary rate interface (PRI) or T1 connection. In a different embodiment, the multiservice network may include a signaling gateway, such as a signaling system 7 (SS7) gateway. The connection between the SS7 gateway and the wide-area IP network 15 is then realized by equipment known to those of ordinary skill in the art. For example, the connection may occur via an Ethernet connection to the router 14, where the PSTN 11 and the SS7 gateway may then be linked by an SS7 system.

(2) Wide-area IP Network

Figure 2:
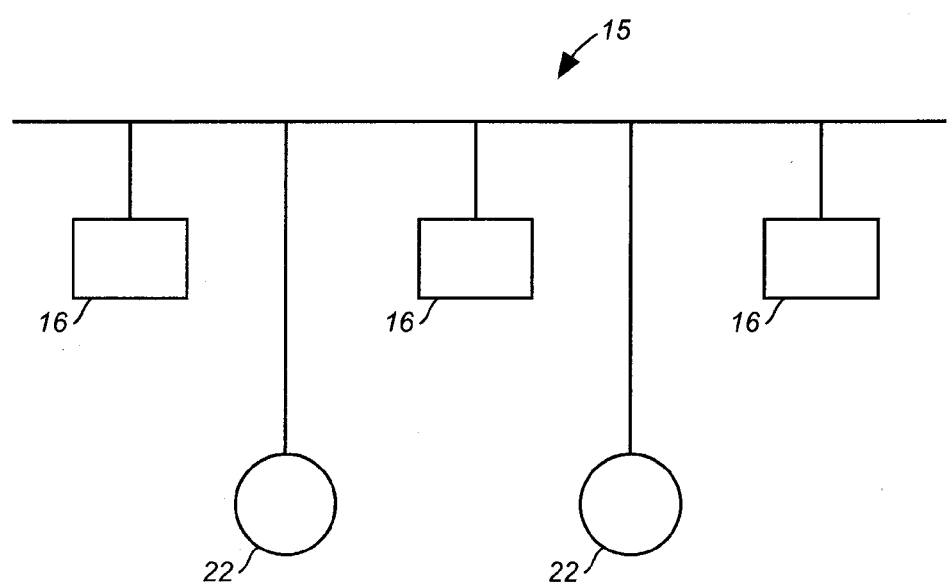
FIG. 2 is an example of an embodiment of some elements of the multiservice network.

Referring to FIG. 2, an example of an embodiment of some elements of the multiservice network is shown. Included are the physical PoPs 16 and data centers 22 which are interconnected by a wide-area IP network 15 providing some degree of quality of service (QoS). QoS, in this context, means that the multiservice network is designed to provide guarantees on the maximum allowed transit delay, jitter and packet loss, as IP packets transit the multiservice network. In one embodiment, the multiservice network may include a wide-area IP network 15 carrying only multiservice network packets. In another embodiment, the multiservice network may include a shared IP network carrying both multiservice network traffic and other data traffic, but providing guarantees on the transmission quality for multiservice network IP packets. The multiservice network may include dedicated leased lines, such as IP over SONET, or IP over DS3, or IP over ATM circuits carrying IP. The multiservice area includes PoPs 16 and data centers 22 connected to each other and dispersed throughout a geographic location such as the United States. The wide-area network may also be multi-national or global.

The multiservice network interconnects the multiservice network PoPs 16 with each other, with the national or regional data centers 22, and possibly with other peer networks providing similar types of services.

(3) National or Regional Data Centers

Figure 3:
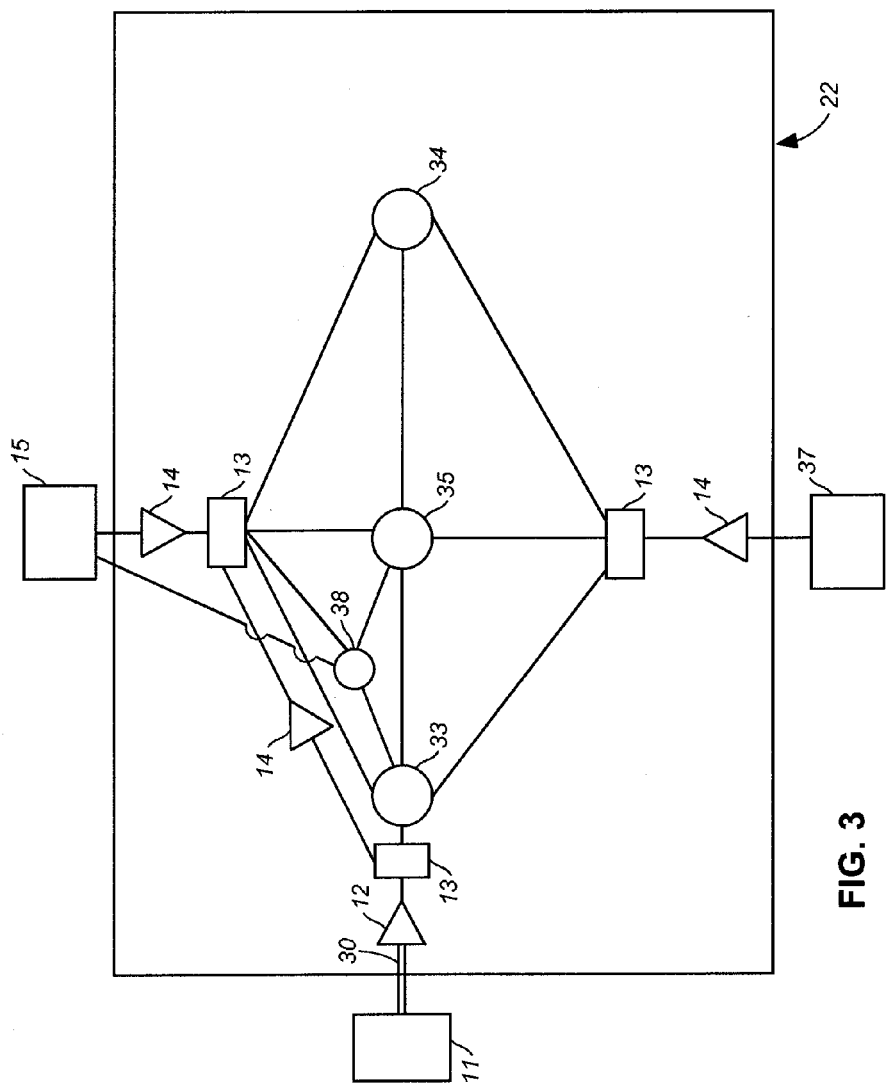
FIG. 3 is an example of an embodiment of the components of the national or regional data centers.

Referring to FIG. 3, an example of a data center 22 is shown. In this embodiment, the data center 22 includes application servers 33, call control equipment 34, databases 35, and a configuration manager for Internet telephony (COMIT) server 38. COMIT, which in other embodiments need not be located in the data center 22, helps manage the multiservice network and is described in more detail below. The application servers 33 are connected to the PSTN 11 via a PRI or T1 cable 30. This connection may be direct, or through small intermediary circuits, or IP-PSTN gateways 12. The application servers 33 are connected to the Internet 37 via IP routers 14. One or more LANs 13 may link the application servers 33 and the IP-PSTN gateway 12 or IP router 14. The databases 35 may include a database for the COMIT server 38, and application server 33, as well as a database for network monitoring and inventory, customer order entry, and provisioning. The database for the COMIT server may be an Oracle 8.0.4 database, for example. The data center 22 is also connected to a wide-area IP network 15 via IP routers 14.

In a different embodiment, the multiservice network may include a signaling gateway, such as a signaling system 7 (SS7) gateway. The connection between the SS7 gateway and the wide-area IP network 15 is then realized by equipment known to those of ordinary skill in the art. For example, the connection may occur via an Ethernet connection to the router 14, where the PSTN 11 and the SS7 gateway may then be linked by an SS7 system.

The multiservice network can have one or several data centers 22 which house the application servers 33, call control equipment 34, databases 35, COMIT server 38, and other computers needed for managing the network, and providing network services such as accounting, authorization, authentication, billing, traffic monitoring, etc. The data centers 22 connect to the public Internet 37, to the wide-area IP network 15, and to the PSTN 11.

(4) Connection to PSTN

The multiservice network connects to the PSTN 11 at the PoPs 16 and the data centers 22. PSTN connections can be either PRIs or T1 trunk circuits or channelized T3 circuits which attach to IP-PSTN gateways 12. At the data centers 22, application servers 33 can connect to the PSTN 11, either directly, or through small intermediary circuit switches, or though IP-PSTN gateways 12 which connect to the PSTN 11.

Figure 4:
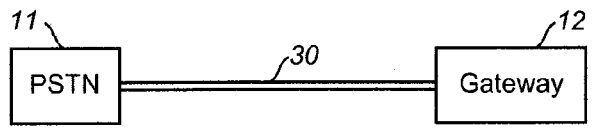
FIG. 4 is an example of some equipment that may be used to connect the PSTN to the multiservice network.

In FIG. 4 is shown an example of some equipment that may be used to connect the PSTN 11 to other elements of the multiservice network. A gateway 12 acts as an interface to the PSTN 11. The gateway 12 and the PSTN 11 are connected by a PRI or T1 cable 30. The gateway 12 in turn can connect to the rest of the multiservice network via a LAN 13 (see FIGS. 1 and 3).

(5) Call Signaling from PSTN to the Multiservice Network

Various signaling information may be provided to the multiservice network. This information includes automatic number identification (ANI), a service that tells the recipient of a telephone call the telephone number of the person making the call. This number can be passed to computer equipment to automatically retrieve associated information about the caller, i.e., account status, billing records, etc. Other information may involve an OCN (original called number).

Still other information may include redirecting number information (RDN), and caller name (CNAM). These may be delivered by a set of communications standards such as integrated services digital network (ISDN). In particular, one of the following channels may be used:

DS0=1 channel PCM at 64 kbps

T1 or DS1=24 channels PCM at 1.54 Mbps

T1C or DS1C=48 channels PCM at 3.15 Mbps

T2 or DS2=96 channels PCM at 6.31 Mbps

T3 or DS3=672 channels PCM at 44.736 Mbps

T4 or DS4=4032 channels PCM at 274.1 Mbps.

Here, PCM is pulse code modulation, a method by which an audio signal is represented as digital data. Instead of using the ISDN to deliver the above-mentioned information, channel associated signaling (CAS), or SS7, a protocol suite used for communication with, and control of, telephone central office switches and their attached processors, may also be used. Call set-ups and signaling across the multiservice network can be accomplished using protocols such as H.323, media gateway control protocol (MGCP) or simple Internet protocol (SIP).

The IP-PSTN gateway may be configured with the help of COMIT, as described below, so that different direct inward dialing (DID) access numbers are provisioned for access to different services. The gateways are configured so that they can identify the type of service expected based on the DID access numbers called. The gateways may capture the calling party number (ANI), and the redirecting number (RDN) or originating called number (OCN) if either is present in the ISDN D-channel. For other services, depending on the DID access number, the gateway may invoke an interactive voice response system (IVR) which may elicit information from the calling party, such as account number and personal identification number (PIN). The gateway associates a service identification code (SIC) with each service. The gateway sends an address request to a gatekeeper or call agent which contains information elements including the SIC. The system of gatekeepers or call agents returns to the gateway an IP address which represents the IP destination address for completion of the next call leg of the requested service. A gatekeeper maintains a registry of devices in the multiservice network. Devices of the multiservice network may register with the gatekeeper at startup, and request admission to a call from the gatekeeper. The gatekeeper may be an H.323 entity that provides address translation and control access for terminals and gateways. The gatekeeper may provide other services to the terminals and gateways, such as bandwidth management and locating gateways.

For example, for a voice over IP (VoIP) call, the access number might be 617-466-4001 and the associated SIC might be 1#. The gateway may play an IVR which asks the calling party to enter dual tone multi-frequency (DTMF) tones corresponding to the destination telephone address. The IVR may also request an account number and a personal identification number (PIN). The account number and PIN is used to authenticate the caller and to initiate a call detail record for billing the call to the entered account number. The gateway then passes system information to the gatekeeper or call agent, including the SIC and the destination telephone number. The GK or CA system then returns to the originating GW the IP address of the destination gateway or VoIP client device attached to the wide-area IP network. The originating gateway then proceeds to complete the VoIP call according to the established VoIP protocol, such as H.323, MGCP or SIP.

As another example, the incoming call may be a voice mail deposit. In this case, calling party A tries to call calling party B. Calling party B arranges to have the PSTN forward an incoming telephone call, if B's telephone is busy or is not answered, to a DID number, such as 617-466-4002, associated with an ingress PoP gateway. The ingress PoP gateway recognizes that any call forwarded to 617-466-4002 is for voice mail deposit and associates SIC 2# with that service. The gateway also captures the calling party's number (A's number) and the called party's number (B's number). The latter appears in either the RDN or OCN filed depending on the switch type of the last PSTN switch that forwarded the call to the gateway. The gateway then sends an address resolution request to the GK or CA system and indicates SIC 2#, and possibly other information such as RDN or OCN field. Based on this information, the GK or CA system returns the IP address of a voice mail server in the data center 22, which provides voice mail (VM) service to subscriber B, or to an egresss gateway in the data center 22, which provides connection to a voicemail server providing VM service to subscriber B. The originating GW then completes a VoIP connection to the destination network element and the call is completed following the VoIP protocol, such as H.323, MGCP, SIP, or an other appropriate VoIP protocol.

Other services may be provided by similar methods, by providing a DID access number for that service on the PoP gateways, associating a SIC with that service, capturing various information elements from an ISDN D-channel or SS7 signaling system, playing an IVR, if necessary, to gather additional information, making an address resolution request to a GK or CA system, configuring the GK or CA system such that it can determine the correct IP address for delivery of the call to another gateway or to an application server 33, or to a H323, MGCP or SIP client device, such as a PC or IP phone. Other services may include unified messaging service, Internet call manager services, conference calling services, and fax services.

(6) Call Control Agents

Call control agents or gatekeepers provide call routing and call control functions. Inbound calls from the PSTN pass call signaling information either to a gateway through the ISDN D-channel or through channel associated signaling (CAS), or, if SS7 is used, signaling information can be passed to call control agents from SS7-IP gateways. The call agents or gatekeepers then use protocols such as H.323, MGCP or SIP to exchange call control information with other network elements to determine the destination IP address of the network element which terminates the inbound call. If necessary, call control agents or gatekeepers can query other databases or service elements to gather information needed to determine call disposition or call routing.

The gatekeeper may manage H.323 endpoints in a consistent manner, allowing them to register with the gatekeeper and to locate another gatekeeper. The gatekeeper provides logic variables for proxies or gateways in a call path to provide connectivity with (PSTN), to improve Quality Of Service (QoS), and to enforce security policies. Multiple gatekeepers may be configured to communicate with one another, either by integrating their addressing into domain naming systems (DNS), or via some other option such as a Cisco IOS configuration.

For example, a gatekeeper may query another gatekeeper to determine the IP destination address of the data center server for depositing an inbound fax or an inbound voice message.

As another example, for a "find-me-follow-me" service, a call control agent may query a database to determine the desired IP or E.164 destination address for the subscriber being called.

As another example, for a credit card call, the call agent may query databases 35 to authenticate the caller's account number or password. A gateway 12 may query a radius server to authenticate the caller's account number or password.

Calls may be routed within the IP portions of the multiservice network, or between PSTN and IP portions of the network, according to rules written to network elements that define their behavior for call control and call routing. Calls within the PSTN may be routed by protocols provided by carriers that are known to those of ordinary skill in the art, such as local exchange carriers (LECs), and interexchange carriers (IXCs). These network elements include, but are not limited to, gatekeepers, IP-PSTN gateways, softswitches, SS7 gateways or interfaces. The routing and call control rules may be embodied as a series of statements written in a convenient language. An example of such a language is the proprietary language of the network element vendors, such as Cisco IOS, which controls the actions and interactions of all network elements. This series of statements is often called a device configuration. The routing and call control rules may also be embodied as software objects (instances of classes written by network element vendors to provide call control), stored procedures, subroutines, or any other generally accepted method of controlling the network element actions. In particular, the routing and call control rules may be embodied as software objects and stored in the memory and persistent storage of network elements such as gateways 12 and gatekeepers described below. Methods of software interfacing to network elements may be generically considered as device configurations, which may be a representation or model of the operating rules of a device.

(7) Connection to the Internet

The data centers 22 connect to the Internet via IP routers 14. Where needed, firewalls may be used to provide necessary security.

(8) Application Servers

With the exception of pure VoIP, services may require dedicated application servers 33, such as fax-servers, messaging servers, conferencing servers, and Internet call-waiting servers, which are needed to deliver services to end-users and to provide various back-office services or end-user services.

For example, an IP-fax server or server cluster is needed to provide a store and forward fax service. Faxes received from the PSTN 11 are delivered over the multiservice network to the fax server, which may authenticate that the sender is an authorized user, and establish a record of the event. The fax server may then deliver the fax either to an end point on the PSTN 11 by directly out dialing from the data center 22 or, over the multiservice network, to a PoP 16 which may deliver the fax as a local PSTN call. Alternatively the fax may be delivered to an IP client by delivering the fax over the Internet. Faxes may also originate from an IP client attached to the Internet and be delivered over the Internet to the fax server at a national data center. After authenticating the user and recording the event, the fax server may then deliver the fax to a fax machine attached to the PSTN or to another IP client attached to the Internet.

A second example is unified messaging, an enhanced service which provides voice mail, fax in-box and email in a single mailbox. The unified messaging (UM) servers and message stores are located in the national data center. Voice mail and faxes may be forwarded from the PSTN to a PoP gateway, transmitted across the multiservice network to the UM server in the data center. Email may be delivered across the Internet to a simple mail transfer protocol (SMTP) server which is part of the UM cluster. The SMTP protocol, defined in STD 10, request for comment (RFC) 821, may transfer electronic mail between computers using, for example, an Ethernet connection. It is a server to server protocol, so other protocols may be used to access the messages. The SMTP dialog happens in the background under the control of the message transport system, e.g., sendmail but it is possible to interact with an SMTP server using telnet to connect to the normal SMTP port, 25. Voice mail and faxes may be delivered as MIME attachments to a subscriber's standard email client. MIME is a standard for multi-part, multimedia electronic mail messages and World-Wide Web hypertext documents on the Internet. MIME provides the ability to transfer non-textual data, such as graphics, audio and fax. It is defined in RFC 1341. It uses mimencode to encode binary data into base 64 using a subset of ASCII. Alternatively, the user can access voice mail, faxes or email headers from a telephony user interface (TUI). A similar system may also be used to provide basic voice mail using a centralized voice mail server.

Another enhanced service is Internet call waiting (ICW), a service in which a dial-up Internet subscriber is alerted to an incoming telephone call by a pop-up message. The subscriber can elect to ignore, play a message or take the call. If the subscriber elects to take the call, the Internet session is suspended, and the incoming call is routed through to the subscriber's telephone. Alternatively, if the subscriber has a voice-enabled PC, the call can be routed to the subscriber's PC. ICW may be implemented by deploying ICW servers in telephone company central offices. With a multiservice network the service is deployed by locating the servers in a national or regional data center 22. Centralized location of the server leads to more efficient use of servers, more rapid deployment over a wide-area, and ease of maintenance.

The application servers 33 may have either PRI or T1 interfaces in which case they interface to the multiservice network through IP-PSTN gateways 12, or they may have IP interfaces which connect directly to the IP network. Some of the application servers 33 may have the ability to originate outbound calls. For example, a fax server receives inbound faxes from either the PSTN via the wide-area network, or over the Internet. In some cases, the application server 33 delivers the fax to a fax machine connected to the PSTN. The application server 33 may either deliver the call across the wide-area IP network to an egress gateway or have a direct connection to the PSTN, in which case the application server 33 directly places a call to the destination telephone number. If the call is to be delivered across the wide-area IP network, the call may go to either a gateway in the data center connected directly to the application server 33, or an intervening circuit switch connecting the application server to the data center gateway. Alternatively, the application server may have its own H323 interface to the wide-area IP network and place the call directly without the need for a data center gateway.

For other services such as voice mail or unified messaging, the VM or UM application servers may have the ability to place outbound calls to deliver messages to the PSTN. As described above, the calls may either go across the wide-area IP network to an egress gateway at a PoP 16, or go directly to the PSTN 11 if the destination telephone is not accessible from the multiservice network.

For delivering international calls, the data center 22 may have connections to international service providers who provide low-cost PSTN connections to international destinations. These international circuits may connect directly to application servers or to circuit switches located in the data center 22.

(9) Configuration Manager for Internet Telephony (COMIT)

A configuration manager for Internet telephony (COMIT) system, including databases and a collection of software tools, may be utilized to help maintain and administer parts of the multiservice network. COMIT servers 38 may be located in the data centers 22. One task of COMIT is to provide a framework for automating some administrative tasks, including the management of the configuration of H.323 elements, PSTN interface testing and auditing, and area code split management. In addition, COMIT may be used to support other activities, including network monitoring, traffic analysis, fault impact analysis, and customer order entry and provisioning.

As will be described in paragraphs that follow, the various components of COMIT may be implemented using a variety of hardware and software that may be commercially and/or proprietary in accordance with a particular implementation and application. For example, one embodiment implements class libraries that will be described below using C++ executed on a Sun Enterprise Server running SunSolaris. Additionally, the graphical user interface (GUI) described that may be included in an embodiment is implemented in one instance using the Perl programming language also using a Sun Solaris system. Additional portions of the tools that may be included in an embodiment of COMIT may be implemented using Java. In an embodiment in which greater portability is desired, the embodiment may have more components implemented using Java, for example. The particular software used may vary in accordance with each embodiment and desired configuration.

For these purposes, at least one COMIT server 38 may be connected to the wide-area network 15, LAN 13, application servers 33, and databases 35. The COMIT server 38 may utilize models, such as the data model described below. COMIT maintains attributes of individual devices such as routers 14, gateways 12, and application servers 33, as well as network-wide constructs such as the dialing plan governing how phone calls are routed through the network. The PSTN data includes attributes of the access lines (e.g., ISDN PRI) connected to gateways 12, the definition of DID number blocks, the association of individual DID numbers with application services, the modeling of the local calling relationships between exchanges in the PSTN 11, and the tracking of area code splits at the individual exchange level.

An embodiment of COMIT may include a number of software tools that support various aspects of the engineering and operation of the multiservice network. A configuration management toolset described below helps to automatically create, audit, and update the network element configurations that control the routing of phone calls through the network. Also described below are tools for automated testing of incalls to DID number blocks and out-calls to the PSTN 11, a tool to analyze the service impact of device failures, and queries to locate DID numbers that are local to a potential customer. It should be noted that other embodiments of a configuration tool may include different software than as described herein for the particular embodiment of COMIT in accordance with particular implementation and application.

COMIT may include a data model stored in a relational database, and a collection of software tools that include a graphical user interface, configuration management tools, multiservice network element maintenance tools, database reporting tools, and software for transferring data between databases.

An H.323 call routing model may be used by COMIT to define outdialing zones and their relationship to gatekeepers, the binding of gateways to outdialing zones, and the association of access numbers with application server clusters. Gatekeepers may define a set of outdial zones representing local calling regions. Such outdial zones may surround major metropolitan areas. A gateway capable of handling local calls to a given region may register with the gatekeeper managing the corresponding outdialing zone, and identifies itself as belonging to that zone. Phone numbers are mapped to outdialing zones by prefixes such as area codes or other destination codes as defined in the ITU E.164 standard. Each prefix may be associated with one outdial zone. Multiple gatekeepers may be used to manage disjoint sets of outdialing zones. In this case, each gatekeeper maintains a mapping of all unique phone number prefixes to the gatekeeper that manages the outdial zone for that prefix. In the PSTN routing model, calls are assigned SICs to indicate the codec to be used over the IP network. For example, SIC 99# may be used to indicate the use of the ITU standard G711 codec. SIC 98# may be used to indicate the use of ITU standard G729 codec. The SIC may not affect the routing of the call. It may be used to control the action of the receiving ("egress") gateway.

Additional SICs may be defined that are routed to an alternative call delivery medium such as a long distance telephone carrier. For example, SIC 89# indicates a call to be delivered via the long distance carrier and utilizing the G711 codec over the IP network. The long distance SICs are routed to a special long distance outdial zone, which is maintained on a separate long distance gatekeeper. The long distance gatekeeper manages a collection of gateways that have direct connections to one or more long distance carriers. The ingress gateways may be programmed to first attempt to place a call using a SIC indicating that the call should be placed by a local gateway. If no gateway is available, the ingress gateway then attempts to place the call using a long distance SIC.

Figure 5:
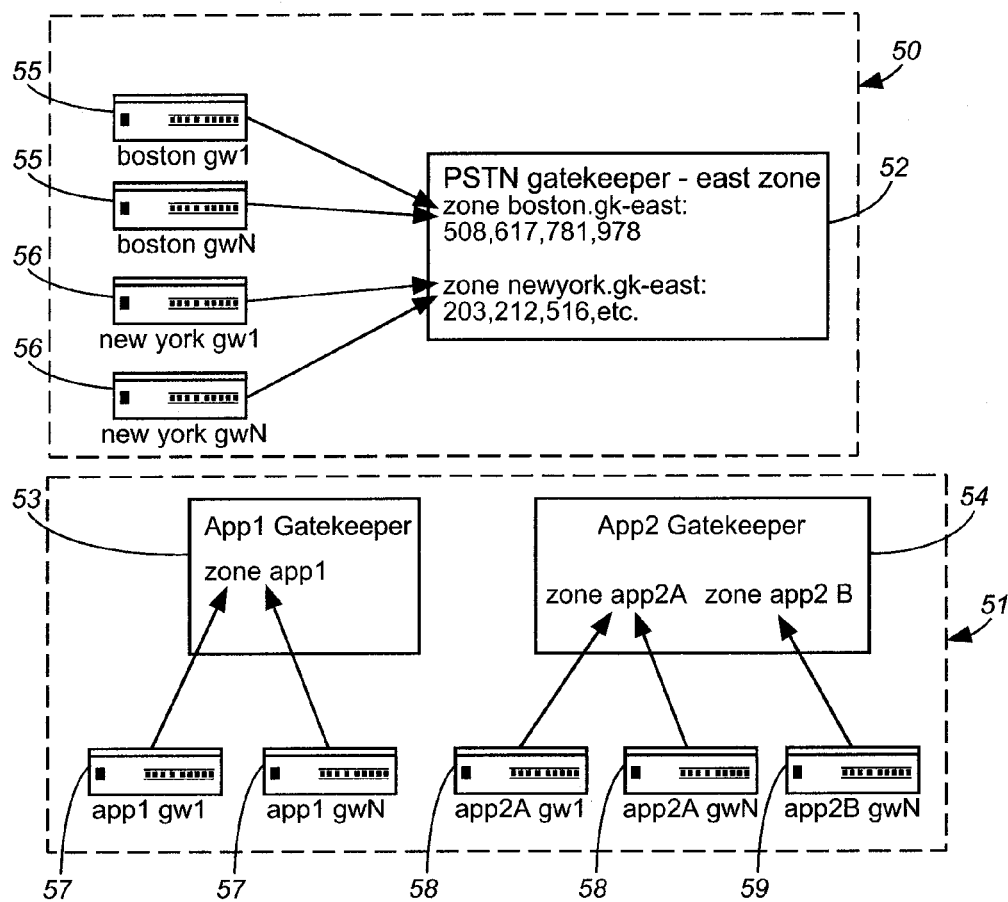
FIG. 5 is an example of a schematic of an H.323 call routing model that may be used by a configuration manager for Internet telephony (COMIT)

Referring to FIG. 5, an example of a schematic of an H.323 call routing model that may be used by COMIT is shown. The H.323 call routing model helps route information in the multiservice network. Two independent routing models may be used: the PSTN routing model 50 and the application routing model 51. The PSTN routing model 50 may be used for calls that are connected to telephone numbers in the PSTN. The application routing model 51 may be used for calls that are connected to application servers. The type of routing model used may be determined by the SIC, which is assigned by an ingress gateway handling the call as it enters the network.

In the PSTN routing model 50, a call may be routed to a gateway that can outdial to a specific phone number in the PSTN. In FIG. 5, four such gateways are shown corresponding to two Boston gateways 55 and two New York City gateways 56, for example. To accomplish this routing, a PSTN gatekeeper 52 may maintain a mapping of all area codes to outdialing zones, as well as the knowledge of which regional gatekeeper manages each particular zone. The Boston gateways 55 and the New York gateways 56 may register with the PSTN gatekeeper 52 and outdialing zone that is appropriate for the trunk groups that are connected to it.

In the application routing model 51, inbound calls from the PSTN have an SIC, sometimes referred to as an application-specific technology prefix, prepended to their destination number by an ingress gateway in the PoP 16. The technology prefix is then used by the PSTN gatekeeper 52 to direct the call to the correct target zone on an application gatekeeper. In the present example, an application 1 gatekeeper 53 and application 2 gatekeeper 54 may select one of the gateways acting as a front-end to the corresponding application server, which may be the application 1 gateway 57, the zone A application 2 gateway 58, or the zone B application 2 gateway 59. Alternatively, application servers may implement H.323 gateway functions directly, thus not utilizing a separate gateway to interface to the IP network.

Figure 6:
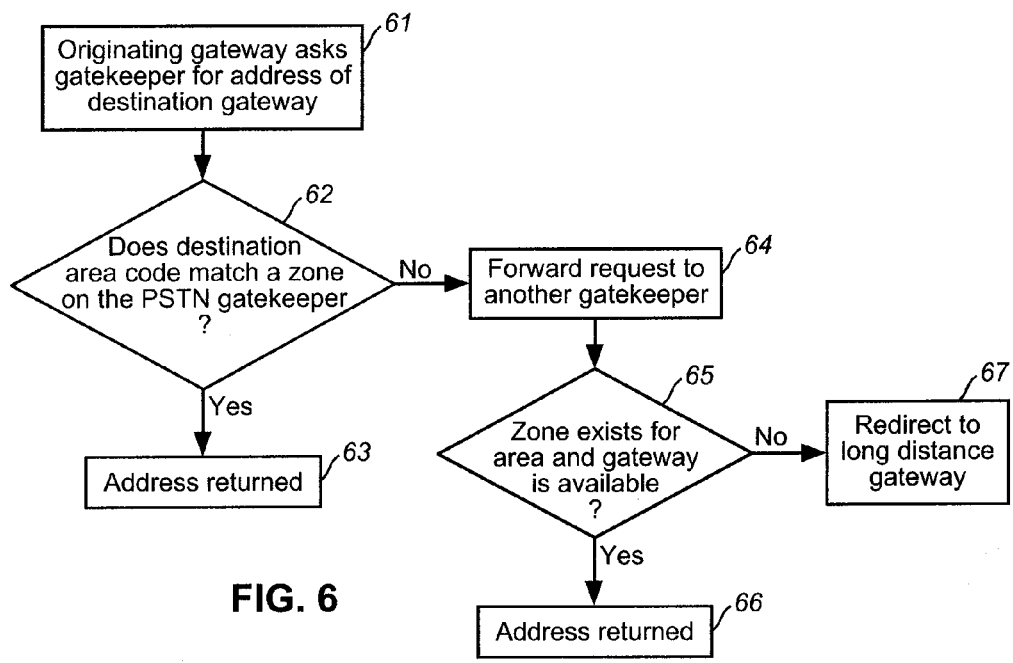
FIG. 6 is an example of a flow chart that provides steps for placing an outbound call originating at an application server.

Referring to FIG. 6, a flowchart is shown of an example of steps of a method of one embodiment for placing an outbound call originating at an application server. In step 61, an originating gateway, such as the Boston gateway 55, or the New York City gateway 56, asks its PSTN gatekeeper 52 to provide it with the address of the destination gateway to which it may direct the call. In step 62, the flow changes depending on whether the destination area code matches a zone on the PSTN gatekeeper 52. If there is such a match, in step 63 the PSTN gatekeeper 52 returns the address of one of the gateways it has registered to that zone. If there is no such match, in step 64 the PSTN gatekeeper 52 forwards the routing request to another gatekeeper that may manage the zone, which in turn picks one of its gateways. In step 65, the flow changes depending on whether no zone exists for the area code, or if no gateways are available for that zone. If such a zone exists, and such a gateway is available, then in step 66 the address is returned. If no such zone exists, or if no such gateway is available, then in step 67 the call is redirected to gateways connected to a long distance carrier.

Figure 7:
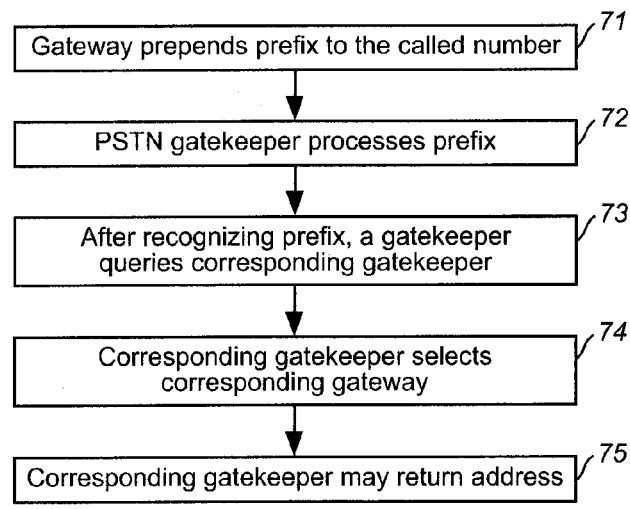
FIG. 7 is an example of a flow chart that provides steps for placing an inbound call originating at the PSTN.

Referring to FIG. 7, a flowchart is shown of an example of steps of a method of one embodiment for placing an inbound call originating at the PSTN. In step 71, the PSTN Boston gateway 55 or New York City gateway 56 prepends a technology prefix to the called number. For example, a prefix of "1#" may be prepended to signify fax service. In step 72, the PSTN gatekeeper 52 processes the technology prefix when it is asked to find a destination gateway. In step 73, the PSTN gatekeeper recognizes the 1# prefix and therefore queries a fax gatekeeper, which may be either of the application 1 gatekeeper 53, or application 2 gatekeeper 54. In step 74, the fax gatekeeper then selects one of the fax front-end gateways, which may be the application 1 gateway 57, the zone A application 2 gateway 58, or the zone B application 2 gateway 59. In step 75, the fax gatekeeper may then return its address to the PSTN Boston gateway 55, or New York City gateway 56.

In addition to the H.323 call routing model described above, COMIT may utilize an object-oriented data model describing the attributes of network components and their relationship to each other, which may be used to configure and maintain the multiservice network. The data model may be used to help store and process information related to the following: Name, address, and contact information for facilities at which devices are located; name, location, description, hardware and software version, and operational status information for managed devices such as H.323 gateways and gatekeepers, Ethernet switches, terminal servers, network routers, multiplexors, modems, application servers, network time servers, network monitoring servers, logging servers, network name servers, authentication and accounting servers; network name, IP address, and network mask for all network interfaces of devices connected to the multiservice network; administrative login name and password for all devices supporting Telnet protocol connections; SNMP protocol version and community string for all devices that support the SNMP protocol; for devices running Cisco Systems, Inc.'s proprietary IOS interface, the "enable" password to perform maintenance functions on the device and the access control list used to restrict access to the device; Internet routing model information, which may include at least one of open shortest path first (OSPF) area designations and static route definitions; the H.323 call routing model discussed above, including definitions of the roles of individual gateways 12 and gatekeepers within the multiservice network, the definition of outdialing zones and application service zones, the association of E.164 telephone number prefixes with outdialing zones, the partitioning of outdialing zones among the PSTN gatekeepers, the partitioning of application service zones among the application gatekeepers, the assignment of SIC to applications and application service zones, and the assignment of specific offsets with DID number blocks to particular application services; for interfaces connecting gateways 12 to the PSTN 11, the type of the interface (e.g., T1, E1, ISDN/PRI, T3), the gateway 12 and hardware interface on the gateway 12 it is connected to, the association of multiple PSTN interfaces into hunt groups, the type of switch that the interfaces are connected to, the protocol attributes of the interface, the direction of the interface (inbound, outbound, bidirectional), and the set of E.164 prefixes that may be out-dialed through the interface; DID number blocks in the PSTN 11 that are used to provide service to PSTN customers, including the starting and ending numbers in the block, the assignment of numbers within the block to particular applications, the identification of the hunt group to which the PSTN switches route calls to the number block, and the testing and operational status of the number blocks; for certain countries, a list of PSTN exchanges and the local calling relationships between exchanges, where exchange data may include an E.164 prefix (e.g., country code, area/city code, and exchange number), city name, state/province name, geographic coordinates of the switch managing the exchange, principal postal code of the area served by the exchange, the unique identifying code of the switch managing the exchange, and important attributes of the switch managing the exchange such as support for call-forward on busy/no-answer, redirecting number, and original called number; for certain countries, a list of PSTN exchanges undergoing a change to its E.164 prefix (e.g., for an area code split in the U.S.), including the old and new E.164 prefix, the first date when the new E.164 prefix can be dialed, and the last date when the old E.164 number can be dialed; identification of the devices that are directly configured and managed by the COMIT configuration tools; and the assignment of individual devices to logging servers, network name servers, network time servers, and authentication and accounting servers.

The data model may be used in the configuration of hardware devices, such as gateways 12 and gatekeepers, to help direct the flow of information exchanged by the wide-area IP network 15 and the PSTN 11, for example. Within the core network, the data model includes objects for devices such as gateways 12, gatekeepers, application servers 33, routers 14, Ethernet switches, and terminal servers. The devices are linked by various network interface objects, including LAN 13 segments and wide-area network 15 links. The model also represents aspects of the PSTN 11 interconnection, such as the access number blocks, the trunk groups to which the access numbers are routed, and the ISDN PRI lines that link trunk groups to gateways. The data model also helps with describing local calling relationships between individual exchanges in the PSTN 11, IP routing, security and accounting managing, network monitoring, and network time servicing.

An embodiment may employ different representations of the data model. An example of such a representation utilizes a C++ class hierarchy, with object persistence provided by a relational database. Separate tables may be created for each of the leaf-level classes in the hierarchy, but the columns in each table may be collected from all levels in the class hierarchy. Another example of a representation of the data model utilizes a relational database schema corresponding to the C++ class hierarchy. Specifically, each table to be described below in the relational database schema corresponds to classes at the leaf-level of the C++ class hierarchy. The above mentioned representations are discussed in more detail below, but, as is understood by one of ordinary skill in the art, other representations are possible.

In one embodiment, an Entity-Relationship model may be used to represent the data model. In this case, for example, an entity may correspond to a table representing a class of all objects of a given type. A row in the table may then correspond to a specific instance of this entity or class of objects. A relationship may correspond to a column of a table for example, by having the columns of one table refer to the columns of another table. A value in a column corresponding to a particular value of an entry in a column may correspond to an attribute.

Figure 8:
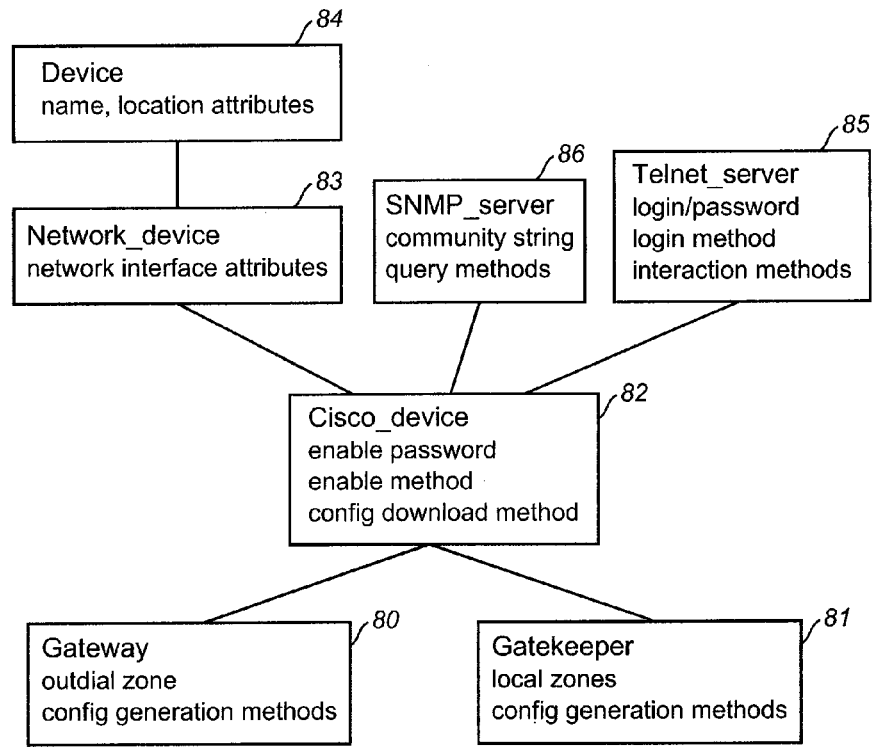
FIG. 8 is an example of a device class hierarchy that is utilized by a first representation of a data model used in COMIT.

It should be noted that other representations are possible and other models may be used in accordance with the descriptions provided herein. Referring to FIG. 8, an example of a device class hierarchy is shown that is utilized by the first representation of the data model. Two leaf-level classes are shown: the Gateway class 80 and the Gatekeeper class 81. The Gateway class 80, for example, inherits from a Cisco-device class 82, which inherits from a Network-device class 83, which inherits from a Device class 84. The Device class 84 contributes columns defining the device name and location information; the Network_device class 83 contributes the fully qualified domain name, IP address, and netmask of the primary network identity for the device. The Cisco_device class 82 contributes an enable password, and the Gateway class 80 contributes the outdialing zone. In addition to defining attributes, various classes in the hierarchy also contribute behaviors. For example, the Gateway class 80 also inherits (via multiple inheritance in the Cisco_device class 82) from the Telnet_server class 85. The Telnet_server class 85 defines login name and password attributes and provides methods for establishing a telnet connection to the device, logging in to the device over the connection, and interacting with the command line interface of the device. The Cisco_device also inherits from a SNMP_server class 86 (simple network management protocol_server class).

The Device class 84 defines attributes that are common to all devices, which may include the following. Id: An identifying number that may be unique with the space of identifying numbers in the data model. Name: A unique name for the device. LocationType: The type of facility where the device resides, which may be a PoP 16, or data center 22. LocationId: The identifying number of the facility. Rack: The location within the facility of the device. HardwareVersion: The hardware type and version. SoftwareVersion: The software type and version. SerialNumber: The device serial number. TermServer: The terminal server managing the device's console port. TSPort: The port on the terminal server that is connected to the device's console port. Status: The status of the device, such as running, under maintenance, and planned.

The Network_device class 83 defines attributes for devices that are connected to the multi-service network, which may include the following. All attributes inherited from the device class. HostName: The network host name for the principal network interface of the device, expressed as a fully-qualified DNS name. NetAddr: The Internet address of the principal network interface of the device. NetMask: The Internet subnet mask of the network to which the principal network interface is connected.

The SNMP_server class 86 defines attributes associated with devices that support SNMP protocol queries. These attributes may include the following. Community: SNMP community string. Version: SNMP version number.

The Telnet_server class 85 defines attributes associated with devices that can be accessed via the standard Telnet protocol, which may include the following. Login: The login name of the administrative account. Password: The password string for the administrative account.

The Cisco_device class 82 defines attributes that are common to all devices running Cisco Systems, Inc.'s IOS operating system. These attributes may include the following. All attributes inherited from the Network_device class. All attributes inherited from the SNMP_server class 86. All attributes inherited from the Telnet_server class 85. EnablePassword: The enable password string required to perform maintenance functions on the device. OSPFArea: The OSPF area of the network to which the device is connected. COMITControlled: A boolean value indicating whether the device's configuration is managed by the COMIT configuration management tools.

In one embodiment, all device entities inherit attributes directly or indirectly from one or more of these five classes.

In addition to the aforementioned representation of the data model that utilizes class hierarchies, a different representation that utilizes a relational database schema may also be used. As known to those of ordinary skill in the art, in a relational database schema, information may be stored in the form of relations, the elements of which may be referred to as attributes. For example, a relation may be a rectangular table. Each entry in a particular row and column of a table may then correspond to an attribute. In one embodiment, devices, interfaces, zones, exchanges, and other entities may be represented by various tables.

Figure 9:
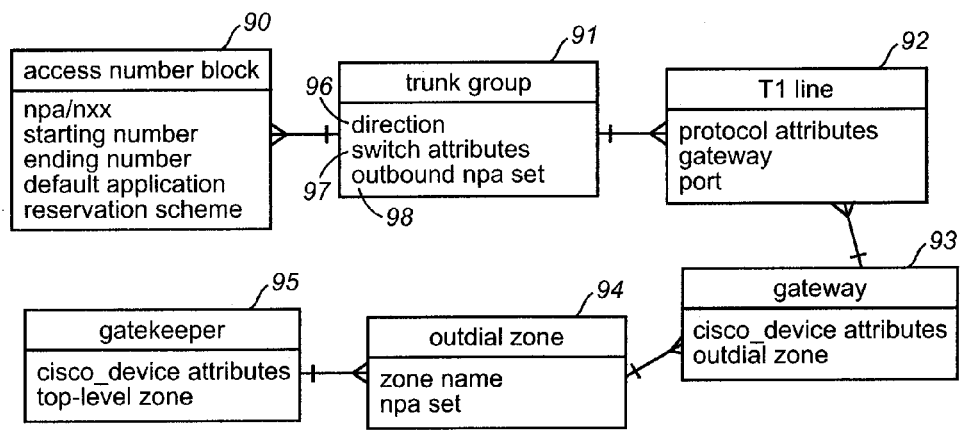
FIG. 9 is an example of a part of a relational database schema that is utilized by a representation of a data model used in COMIT.

Referring to FIG. 9, an example of a part of a relational database schema for the data model is schematically presented. An access number block table 90, a trunk group table 91, a T1 line table 92, a gateway table 93, an outdial zone table 94, and a gatekeeper table 95 are shown schematically as an illustrative example. To each of the six tables 90-95 in FIG. 6 corresponds a class at the leaf-level of the C++ class hierarchy. Tables 93 and 95 correspond to the leaf-level classes 60 and 61 in FIG. 8. The subheadings below the vertical line in a table represent columns or collection of columns of the table. (Contrary to the usual convention, the columns are listed vertically, instead of horizontally, for convenience.) For example, the trunk group table 91 has three subheadings corresponding to a direction column 96, a switch attributes column 97, and an outbound numbering plan area (NPA) set column 98. The switch attributes column 97, for example, signifies the number of columns representing the characteristics of a switch, while the direction column 96 may be used to signify whether calls may be placed or received. The attributes (not shown) of a particular row correspond to object instances of the corresponding class. As is understood by one of ordinary skill in the art, the lines connecting tables 90-95 convey relationships between objects. The three prongs or crow's foot on one side of a line indicates that many objects in the associated table are involved in a given relationship. A "l" on one side of the line indicates that only one object in the associated table is involved in a given relationship. For example, the lines connecting the access number block table 90 and the trunk group table 91 indicate that there are many "access number block" objects associated with each single "trunk group" object.

Figure 10:
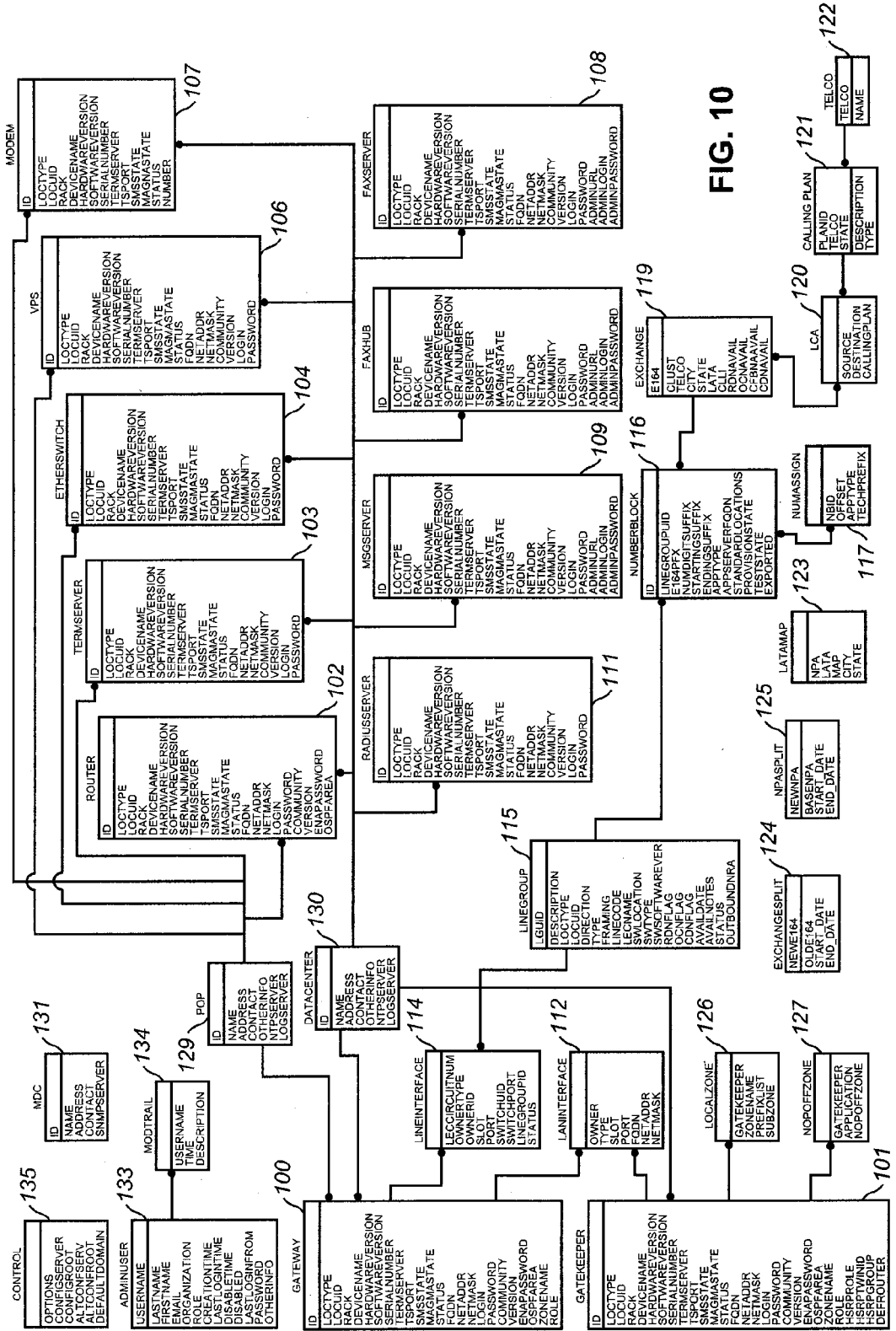
FIG. 10 is an example of a more complete relational database schema that is utilized by a representation of a data model used in COMIT.

In FIG. 10, a more complete relational database schema is schematically presented. In the representation of the data model that is the relational database schema, device entities may be represented by the following tables.

Gateway table 100 may represent an H.323 gateway device connecting the PSTN 11 to other parts of the multiservice network. A Gateway table may have the following attributes: attributes inherited from the Cisco_device class 82; ZoneName: the name of the Zone instance defining the outdialing region or gatekeeper associated with the gateway; Role: the role of the gateway, which may be one of PSTN gateway (a gateway managing connections to a local exchange carrier), FAX gateway (a gateway acting as a front end to a FAX application server), UM gateway (a gateway acting as a front end to a Unified Messaging application server), ICM gateway (a gateway acting as a front end to an Internet Call Manager application server), PSTN LD gateway (a gateway providing outdialing service via a long distance carrier), VoIP CP gateway (a gateway that interfaces to a PBX or key system managing a customer's private telephone network), and VoIP LD gateway (a gateway providing outdialing service for H.323 clients on the public Internet); EnableAllCalls: a boolean value indicating whether the gateway will place PSTN-routed calls over the multiservice network; EnableCallAcct: a Boolean value indicating whether the gateway will send accounting information to the network's accounting server.

Gatekeeper table 101 may represent an H.323 gatekeeper device that provides call routing services for the multiservice network. A Gatekeeper table 101 may have the following attributes: attributes inherited from the Cisco_device class 82; Role: the role of the gatekeeper, which may be one of POP gatekeeper (a gatekeeper managing PSTN and VoIP CP gateways at POPs in a defined geographic region), DC gatekeeper (a gatekeeper managing application gateways in a datacenter 22), LD gatekeeper (a gatekeeper managing gateways connected to a long distance provider), and VoIP LD gatekeeper (a gatekeeper managing VoIP LD gateways); Hot Standby Routing Protocol (HSRP) attributes, which may define the role of the gatekeeper within a high-availability redundant pair of gatekeepers, and where these attributes may include the HSRP role (primary or secondary), the unique identifier of the other gatekeeper in the HSRP pair, and the HSRP group number; DefRouter: the IP address of the default router on the subnet that this gatekeeper is connected to.

Router table 102 may represent a network router device. No attributes are defined beyond those inherited from the Cisco_device class 82.

TermServer table 103 may represent a terminal server device. No attributes are defined beyond those inherited from the Cisco_device class 82.

EtherSwitch table 104 may represent an Ethernet switch device. No attributes are defined beyond those inherited from the Cisco_device class 82.

Mux table (not shown) may represent a telephony circuit multiplexor device. No attributes are defined beyond those inherited from the Device class 84.

UPS table 106 may represent an uninterruptible power supply device. No attributes are defined beyond those inherited from the Network_device class 83.

Modem table 107 may represent a modem device for sending ASCII data over DS0 telephone connections. A Modem table 107 may have the following attributes: attributes inherited from the Device class 84; PhoneNumber: a phone number string that may be used to access the modem via the PSTN.

FaxServer table 108 may represent a FAX application server. A FaxServer table 108 may have the following attributes: attributes inherited from the Network_device class 83; attributes inherited from the Telnet_server class 85; attributes inherited from the SNMP_server class 86; AdminURL: the HTTP URL string specifying the top-level administrative web page corresponding to the fax application server; AdminLogin: a string defining the login name that may be required to access the administrative web page; AdminPassword: a string defining the password that may be required to access the administrative web page.

MsgServer table 109 may represent a Unified Mess aging server. A MsgServer table 109 may have the following attributes: attributes inherited from the Network_device class 83; attributes inherited from the Telnet_server class 85; attributes inherited from the SNMP_server class 86; AdminURL: the HTTP URL string specifying the top-level administrative web page corresponding to the Unified Messaging server;.AdminLogin: a string defining the login name that may be required to access the administrative web page; AdminPassword: a string defining the password that may be required to access the administrative web page.

ICMServer table (not shown) may represent an Internet Call Manager server. An ICMServer table may have the following attributes: attributes inherited from the Network_device class 83; attributes inherited from the Telnet_server class 85; attributes inherited from the SNMP_server class 86; AdminURL: the HTTP URL string specifying the top-level administrative web page corresponding to the Internet Call Manager server; AdminLogin: a string defining the login name that may be required to access the administrative web page; AdminPassword: a string defining the password that may be required to access the administrative web page.

RadiusServer table 111 may represent an authentication, authorization, and accounting server supporting the Radius protocol, or Remote Authentication Dial In User Service protocol as defined, for example, in RFC 2058. A RadiusServer table 111 may have the following attributes: attributes inherited from the Network_device class 83; attributes inherited from the Telnet_client class 85; attributes inherited from the SNMP_server class 86; AuthPort: an authentication port number, used to access the authentication service; AcctPort: an accounting port number, used to access that accounting service; AltAcctPort: an alternate accounting port number, used to provide a separate accounting service for VoIP LD gateways.

In the representation of the data model that is the relational database schema, interface entities, which may help with the connection of a network device with other elements of the multiservice network, may be represented by the following tables.

LANInterface table 112 may represent a local area network interface. There may be zero or more local area network interface instances for each instance inherited from the Network_device class 83. A LANInterface table 112 may have the following attributes: OwnerId: the unique identifier of the network device the interface is connected to; Type: the type of the LAN interface (e.g., Ethernet); Adapter, Slot, Port: the hardware address of the interface on the device, which may be expressed as an adapter number, slot number, and port number; NetAddr: the Internet address (if any) of the interface; NetMask: the subnet mask of the network that the interface is connected to; OtherEnd: the Internet address (if any) of the device at the other end of a switched ethernet network segment, for interfaces connected in such an arrangement; OtherAdapter, OtherSlot, OtherPort: the hardware address of the interface on the other end of the switched ethernet segment, which may be expressed as an adapter number, slot number, and port number; Speed: the speed of the interface; Limit: the maximum speed of the interface; Status: the current status of the interface; Description: a description of the interface.

WANInterface table (not shown) may represent a wide-area network interface for a network device. There may be zero or more wide-area interface instances for each network device instance. A WANInterface table may have the following attributes: OwnerId: the unique identifier of the device the interface is connected to; Type: the type of the WAN interface; Adapter, Slot, Port: the hardware address of the interface on the device, which may be expressed as an adapter number, slot number, and port number; NetAddr: the Internet address of the interface; NetMask: the subnet mask of the network that the interface is connected to; OtherEnd: the Internet address of the interface at the other end of the WAN connection; OtherAdapter, OtherSlot, OtherPort: the hardware address of the interface on the other end of the WAN connection, which may be expressed as an adapter number, slot number, and port number; Speed: the speed of the interface; Limit: the maximum speed of the interface; Status: the current status of the interface; Description: a description of the interface; CircuitId: the circuit ID of the WAN connection;

A LineInterface table 114 may represent a connection between a gateway and a PSTN telephony switch or application server. There may be zero or more LineInterface instances for each Gateway instance. Each LineInterface instance has one associated LineGroup instance, but each LineGroup instance may be associated with zero or more LineInterface instances. A LineInterface table 114 may have the following attributes: CircuitId: the circuit ID of the telephony connection; OwnerId: the unique identifier of the gateway device; Adapter, Slot, Port: the hardware address of the corresponding interface on the gateway device, which may be expressed as an adapter number, slot number, and port number; LineGroupId: the unique identifier of the LineGroup entity representing the hunt group that this interface is a part of; Status: the status of the interface; Description: a description of the interface.

A LineGroup instance may represent a collection of LineInterface instances connected to the same PSTN switch, configured with identical protocol attributes, and providing a common pool of DS0 channels to which phone calls may be directed. One LineGroup instance is associated with zero or more LineInterface instances. A LineGroup table 115 may have the following attributes: Id: a unique identifier number; Description: a description; LocationType: the type of location, such as a PoP 16 or data center 22, where the gateways reside whose LineInterface instances are included in the LineGroup; LocationId: the unique identifier of the location where the gateways reside whose LineInterface instances are included in the LineGroup; Direction: the direction of call flow in the linegroup (inbound from the PSTN, outbound to the PSTN, or both); Type: the type of the LineInterface instances included in the LineGroup (e.g., T1, T3, ISDN/PRI); LineCode: the line code and framing configuration of the component lines; CASType, CASAttr: for channel-associated signaling, the type and attributes of the inband signaling protocol (e.g., feature group D, multi-frequency signaling with DNIS and ANI); SwitchType: the type of the PSTN switch handling the LineGroup; SwitchLocation: the location of the PSTN switch; SwitchVersion: the version of the PSTN switch; RDNAvail, OCNAvail, CDNAvail: three boolean values indicating whether the switch provides redirecting number, original called number, or calling number information; AvailDate: the date on which the LineGroup will be available; Status: the current status of the LineGroup; OutboundNPA: the set of E164 prefixes that may be outdialed using this LineGroup.

In the representation of the data model that is the relational database schema, PSTN-related entities, which are related to the programming or operation of the multiservice network, may be represented by the following tables.

NumberBlock table 116 may represent a contiguous set of numbers in the PSTN telephone number space that are routed as DID numbers to one LineGroup instance. Zero or more NumberBlock entities are associated with one LineGroup instance. A NumberBlock table 116 may have the following attributes: Id: a unique identifier number LineGroupId: the unique identifier of the LineGroup entity that all numbers in this block will be routed to by the PSTN; E164Pfx: the common E164 prefix of all numbers in this block; NumDigitSuffix: the number of digits following the E164 prefix in the full number; StartingSuffix: the lowest numeric suffix in the block; EndingSuffix: the highest numeric suffix in the block; ReservationType: the number assignment scheme for the block, where number assignment schemes may include "small reservations" (in which the first 20 numbers are reserved as common access numbers for specific applications), "standard reservations" (in which the first 50 numbers are reserved as common access numbers for specific applications), and "no reservations" (in which no numbers are reserved for common access numbers); AppType: the application type associated with all non-reserved numbers in the block.

NumAssign table 117 may represent a specification of the association of a reserved number in a number block with a specific application. A NumAssign table may have the following attributes: NBId: the unique identifier of the number block this NumAssign instance applies to, where a value of 0 indicates that the assignment pertains to all number blocks with reserved numbers; Offset: the offset into the number block that this NumAssign instance pertains to, a value of −1 indicates that this assignment pertains to the non-reserved numbers in the block; AppType: the type of the application associated with the number; TechPrefix: the SIC used to route calls to the corresponding application server; AppServerFQDN: the fully qualified DNS name of the server that manages accounts for the collection of application servers to which this number will be routed; PartitionId: a string identifying the specific cluster of application servers to which this number will be routed.

NumberProps table (not shown) may represent a specification of the testing and provisioning status of numbers in a NumberBlock instance, which may be used to support automated processes for provisioning access numbers on application servers and testing their function. A NumberProps instance may have the following attributes: NBId: the unique identifier of the NumberBlock instance this is associated with; Offset: the offset into the NumberBlock instance this NumberProps instance applies to; ProvisionState: the status of provisioning of this number on the associated application service, which may be one of "don't provision," "provisioning required," and "provisioning complete"; NetTestState: the status of testing PSTN access to the number, which may be one of "don't test," "testing required," and "testing complete"; AppTestState: the status of application-level testing of the number, i.e., verification that calls to the number arrive at and are recognized by the correct application server cluster, which may be one of "don't test," "testing required," and "testing complete."

Exchange table 119 may represent a contiguous collection of numbers in the PSTN number space that are handled by a single switch and are associated with a local geographic region. An exchange table 119 may have the following attributes: E164Pfx: the unique E.164 prefix of all numbers in the exchange, where, for example, in North America this has the format 1AAAXXX, where "1" is the country code, "AAA" is a 3-digit area code, and "XXX" is a 3-digit exchange number; Clust: a unique cluster identifier, representing a collection of exchanges with identical local calling relationships to other exchanges; Telco: a unique telephone company identifier, indicating the local exchange carrier managing the switch that handles the exchange; City: the principal city served by the exchange; State: the state/province/region in which the principal city is located; Lata: the Local Access Transport Area (LATA) code for the exchange (may be applicable to North America only); the CLLI code for the switch managing the exchange (may be applicable to North America only); RDNAvail, OCNAvail, CFBNAAvail, CDNAvail: four boolean values indicating whether the exchange supports redirecting number, original called number, call forwarding on busy/no answer, and calling party number; ZipCode: the postal code (e.g., zip code) of the geographic area served by the exchange; Vertical, Horizontal: the geographic coordinates of the location of the switch serving the exchange, which may be expressed as Bell System V & H coordinates.

LCA table 120 may represent a local calling arrangement between two clusters of exchanges. An LCA table 120 may have the following attributes: Source: the unique identifier of the cluster of exchanges that may originate a local call under this arrangement; Destination: the unique identifier of the cluster of exchanges that may terminate a local call under this arrangement; CallingPlan: a calling plan identifier indicating the type of calling plan (business, residential, flat rate, measured rate, etc.) under which the arrangement is defined.

CallingPlan table 121 may represent a specific local calling plan scheme defined by a local exchange carrier for exchanges in a given territory. A CallingPlan table 121 may have the following attributes: Id: a calling plan identifier number; Telco: a unique identifier number for the local exchange carrier managing the calling plan; State: the state/province/region that the plan is defined in; Description: a description of the plan; Type: a boolean value for which "true" indicates that the plan is a residential plan, and "false" indicates a business plan.

Telco table 122 may represent an association of a local exchange carrier unique identifier with a company name. The Telco table 122 may have the following attributes: Id: the unique identifier for the local exchange carrier; Name: the text name of the local exchange carrier.

LataMap table 123 may help represent, within North America, a mapping of area code or LATA to a principal city and state within the region served by the area code. A LataMap table 123 may have the following attributes: NPA: an area code; Lata: the LATA number of the LATA containing most of the exchanges in the area code; NPAList: a list of all area codes that exist primarily in the given LATA; City: the name of the city that contains the most exchanges in this area code; State: the name of the state/province/region of the city.

ExchangeSplit table 124 may help represent a renaming of an exchange's E.164 prefix, as occurs during an area code split in North America. An ExchangeSplit table 124 may have the following attributes: OldE164: the original E.164 prefix for the exchange; NewE164: the new E.164 prefix for the exchange; StartDate: the first date on which the new E.164 prefix can be dialed; EndDate: the last date on which the old E.164 prefix may be dialed.

NPASplit table 125 may help represent, within North America, an area code split event in which a subset of the exchanges in one area code are reassigned to a newly created area code. An NPASplit table 125 may have the following attributes: OldNPA: the original area code; NewNPA: the new area code; StartDate: the first date on which the new area code can be used to dial the affected exchanges; EndDate: the last date on which the old area code can be used to dial the affected exchanges.

In the representation of the data model that is the relational database schema, entities, which are related to the H.323 call routing model, may be represented by the following tables.

LocalZone table 126 may represent a named collection of E.164 prefixes that are routed to the same pool of outdialing resources. A LocalZone instance is associated with a single (possibly replicated) logical gatekeeper. These correspond directly to the "zone" concept of Cisco's IOS command line interface. A LocalZone table 126 may have the following attributes: ZoneName: the unique name of the local zone; GatekeeperId: the unique identifier number of the gatekeeper managing the zone; PrefixList: a list of E.164 prefixes that are routed to gateways that register with the indicated zone; SubZone: a boolean value that is true if this zone is a not the top-level zone on its Gatekeeper.

HopOffZone table 127 may represent a directive defining the routing of SIC's to application service zones on a given gatekeeper, corresponding directly to the "hopoff" directives in Cisco's IOS command line interface. A HopOffZone table

127 may have the following attributes: GatekeeperId: the unique identifier number of the gatekeeper to which the HopOffZone applies; AppType: the application type governed by this HopOffZone; ZoneName: the name of the application zone to which calls bearing the application's SIC are to be routed.

NumberXForm table (not shown) may represent a rule defining the renaming of called numbers during the processing of calls on a gateway. This corresponds directly to a "num-exp" directive in Cisco's IOS command line interface. A NumberXForm table may have the following attributes: ObjectId: the unique identifier of a Gateway or LineGroup that the number transformation applies to, such that if the identifier names a Gateway, then the transformation is applied only to that Gateway, and if the identifier names a LineGroup, then the transformation is applied to all Gateways that have LineInterface instances belonging to that LineGroup; SourcePat: a Cisco IOS telephone number pattern for matching the called number; DestPat: a Cisco IOS telephone number pattern defining the replacement number to be generated in place of the called number; Description: a description of the purpose of this transformation rule.

In the representation of the data model that is the relational database schema, entities related to facilities where devices may be located may be represented by the following tables.

A POP table 129 may represent a PoP 16. A POP table 129 may have the following attributes: Id: a unique identifying number; Name: a short name, which may conform to a standard naming convention and be used as a prefix for naming devices housed at this location; Address: the postal address of the POP facility; Contact: the name, address, and other contact information for the person or persons responsible for the management of the location; NTPServers: a list of Internet addresses for the network time servers to be used by devices at this location; LogServers: a list of Internet addresses for the logging servers to be used by devices at this location; NameServers: a list of Internet addresses of the DNS name servers to be used by devices at this location.

Datacenter table 130 may represent a data center 22. A Datacenter table 130 may have the following attributes: Id: a unique identifying number; Name: a short name, which may conform to a standard naming convention and be used as a prefix for naming devices housed at this location; Address: the postal address of the Datacenter facility; Contact: the name, address, and other contact information for the person or persons responsible for the management of the location; NTPServers: a list of Internet addresses for the network time servers to be used by devices at this location; LogServers: a list of Internet addresses for the logging servers to be used by devices at this location; NameServers: a list of Internet addresses of the DNS name servers to be used by devices at this location.

NOC table 131 may represent a network operations center facility, which has responsibility for monitoring the status of components of the multiservice network. A NOC table 131 may have the following attributes: Id: a unique identifying number; Name: a short name, which may conform to a standard naming convention and be used as a prefix for naming devices housed at this location; Address: the postal address of the NOC facility; Contact: the name, address, and other contact information for the person or persons responsible for the management of the location; SNMP_servers: a list of Internet addresses for the SNMP network management servers located at the facility.

In the representation of the data model that is the relational database schema, entities related to security and auditing features may be represented by the following tables.

AccessControl table (not shown) may represent a specification of a particular set of network addresses that are to be allowed Telnet access to a controlled device. This corresponds directly to the "access-list" directive of Cisco's command line interface. An AccessControl table may have the following attributes: Class: a class number used to identify this directive as belonging to a group of related directives that can be applied as a unit; NetAddr: an Internet address pattern defining a set of network addresses to be permitted access by this directive; WildMask: a bitmask indicating bits in the Internet address pattern (interpreted as an unsigned 32-bit binary number) that are allowed to assume any value when matching the pattern against the address of a potential telnet client system; Description: a description of the collection of network addresses controlled using this AccessControl specification.

AdminUser table 133 may represent a user account for accessing the COMIT graphical user interface. An AdminUser table 133 may have the following attributes: User: a user name string, used at the login prompt; LastName: the last name of the user; FirstName: the first name of the user; Email: the email address of the user; Organization: the name of the user's organization; Role: the role of the user, which defines the user's rights and capabilities within the interface, and which may include, for example, "adminstrator" (full access to all data and functionality), "read/write" (full access to all data except user accounts, modification trail data, and experimental functionality), and "read-only" (read-only access to all data except security information); CreationTime: the date and time the user account was created; LastLoginTime: the date and time of the last login using this account; DisabledOn: the date and time that the account was disabled; Disabled: a boolean value indicating whether the account is disabled; Password: the password for the account.

ModTrail table 134 may represent a record of a modification to the contents of the database made via a graphical user interface. A ModTrail table 134 may have the following attributes: User: the user name for the AdminUser making the change; ModTime: the date and time at which the change was made; Description: a text description of the change.

In the representation of the data model that is the relational database schema, a control entity may be represented by the following table.

Control table 135 may represent a control entity having a single instance (row). A Control table 135 may have the following attributes: Options: a string of tokens representing options controlling the behavior of various tools in COMIT (principally the configuration management tool); ConfigServer: the Internet address of a TFTP server where device configuration files are stored; ConfigRoot: the full pathname of the directory on the TFTP server where configuration files are stored; AltConfServ: the Internet address of a secondary TFTP server where configuration files are to be stored; AltConfRoot: the full pathname of the directory on the secondary TFTP server where configuration files are stored; DefaultDomain: the Domain Name Service domain that should be assumed when none is specified; LoadRoot: the full pathname of the directory on the configuration server where device operating system image files are located.

The data model may be used to support many functions, including H.323 device configuration management, testing of PSTN interfaces, provisioning of DID number blocks on application servers, and provisioning of network management servers.

The COMIT configuration management tool uses the contents of the COMIT data model to create device configurations for gateways and gatekeepers in the multiservice network. A device configuration may be expressed as a text file containing Cisco IOS command line directives, which may be downloaded to a gateway or gatekeeper and installed as the active configuration for the device.

In one embodiment, the COMIT configuration management tool generates a Gateway or Gatekeeper configuration file consisting of Cisco IOS commands via the procedure described below. In this description, attributes of a table are referenced as <table>::<attribute-name> or <class>::<attribute-name>. Unless otherwise noted, the use of an attribute reference applies to the attribute associated with the particular device instance for which the configuration file is being generated. For example, Gateway::ZoneName refers to the outdial zone name attribute of the Gateway instance whose configuration is being generated, and Device::LocationID refers to the location unique identifier number inherited from the Device class by the device instance whose configuration is being generated.

All procedures described below assume that output is being written to a file on the configuration management server, and that this file may be subsequently copied to the corresponding gateway or gatekeeper device and installed as the operational configuration of that device.

Gateway Configuration Procedure:
 (1) Invoke the generic Cisco_device Initial Configuration Procedure on the Gateway instance, described below.
 (2) Voiceport configuration:
  (a) Let L be the set of all LineInterface instances for which LineInterface::OwnerId equals Device::Id.
  (b) Let LG be the set of all LineGroup instances where LineGroup:Id equals LineInterface::LineGroupId for some LineGroup instance in L.
  (c) If LineGroup::Type is "ISDN PRI" for some LineGroup in LG then generate the command "isdn switch-type <token>", where <token> is an IOS switch-type identifier corresponding to the value of LineGroup::SwitchType (e.g., "primary-5ess", "primary-dms100", "primary-ni"). Subject to the same condition, generate the command "isdn display layer2-status";
  (d) For each LineInterface in L, invoke the Controller Configuration Procedure on the LineInterface, described below.
  (e) For each element <N> of the set {0,1,2,3}, if there does not exist a LineInterface in L such that LineInterface::Port equals <N>, then generate the commands "controller T1<N>" and "shutdown",
 (3) Dial-peer configuration:
  (a) Invoke the POTS DialPeer Configuration Procedure on the Gateway instance, described below. (NOTE: The POTS Dialpeer is defined and known in accordance with the Cisco device configuration).
  (b) Invoke the Standard VoIP DialPeer Configuration Procedure on the Gateway instance, described below.
  (c) Let NB be the set of NumberBlock instances such that there exists a LineInterface L where L::OwnerId equals Device::Id and NumberBlock::LineGroupId equals L::LineGroupId.
  (d) For each NumberBlock in NB, invoke the NumberBlock DialPeer Configuration Procedure on the NumberBlock and this Gateway, described below.
  (e) For each NumberBlock in NB such that there exists an ExchangeSplit table 124 where ExchangeSplit::OldE164 equals NumberBlock164Pfx or ExchangeSplit::NewE164 equals NumberBlock.E164Pfx, and the current date is later than one month prior to ExchangeSplit::StartDate and earlier than one month following ExchangeSplit::EndDate, invoke the NumberBlock DialPeer Configuration Procedure on the NumberBlock and this Gateway, with NumberBlock::E164Pfx changed to either ExchangeSplit::OldE164 or ExchangeSplit::NewE164, whichever value differed from the original value of NumberBlock::E164Pfx.
 (4) For each NumberXForm such that NumberXForm::ObjectId equals Device::Id or there exists a LineInterface such that NumberXForm::ObjectId equals LineInterface::LineGroupId and LineInterface::OwnerId equals Device::Id, generate the command "num-exp <SRC> <DST>", where <SRC> is NumberXForm::SourcePat
and <DST> is NumberXForm::DestPat.
 (5) Loopback interface configuration:
  (a) generate the command "interface Loopback0";
  (b) generate the command "ip address <N> <M>" where <N> is Network_device::NetAddr and <M> is Network_device::NetMask.
  (c) generate the command "h323-gateway voip interface"
  (d) generate the command "h323-gateway voip h323-id <ID>@<DOM>" where <ID> is a character string less than or equal to 12 characters in length that is unique among all gateway instances, and <DOM> is a part of the Network_device::HostName following the first "." character.
  (e) generate the command "h323-gateway voip id <Z> ipaddr <N> 1719" where <Z> is Gateway::ZoneName, and <N> is the Network_device::NetAddr for the Gatekeeper instance such that there exists a LocalZone instance where the Gatekeeper's Device::Id equals LocalZone::GatekeeperId and LocalZone::ZoneName equals Gateway::ZoneName.
  (f) generate commands "h323-gateway voip tech-prefix <SIC>#", where <SIC> takes on the values:
   i. "1" if Gateway::Role is "Fax"
   ii. "2" and "3" if Gateway::Role is "UM"
   iii. "4" if Gateway::Role is "ICM"
   iv. "99", "98", and "97" if Gateway::Role is one of "PSTN", "PSTN LD", "VoIP LD", or "VoIP CP", and there exists at least one LineInterface associated with the Gateway whose associated LineGroup::Direction implies outbound dialing.
   v. "89", "88", and "87" if Gateway::Role is one of "PSTN LD" or "VoIP LD", and there exists at least one LineInterface associated with the Gateway whose associated LineGroup::Direction implies outbound dialing.
 (6) For each LANInterface whose LANInterface::OwnerID equals Device::Id:
  (a) generate the command "interface <T>0" where <T> is "Ethernet" if LANInterface::Type is "Ethernet", and "FastEthernet" if LANInterface::Type is "FastEthernet".

(b) generate the command "ip address <N> <M>" where <N> is LANInterface::NetAddr and <M> is LANInterface::NetMask.
(c) if LANInterface::Type is "FastEthernet", generate the commands "duplex auto", "speed auto", and "ip ospf cost 2".
(d) if LANInterface::Type is "Ethernet", generate the command "ip ospf cost 10".
(e) generate the commands "ip ospf priority 0", "no ip directed-broadcast", and "no shutdown".
(7) For each LineInterface such that LineInterface::OwnerId equals Device::Id and there exists a LineGroup such that LineGroup::Id equals LineInterface::LineGroupId and LineGroup::Type is "ISDN PRI":
   (a) generate the command "interface Serial<P>:23" where <P> is LineInterface::Port.
   (b) generate the commands "no ip address", "no snmp trap link-status", and "dialer-group 1".
   (c) generate the command "isdn switch-type <token>", where <token> is an IOS switch type token corresponding to LineGroup::SwitchType.
   (d) generate the commands "isdn incoming-voice modem", "no fair-queue", and "no cdp enable".
(8) Routing configuration:
   (a) generate the command "router ospf 109".
   (b) For each <N>, <M> defined as:
      i. Network_device::NetAddr and Network_device::NetMask, or
      ii. LANInterface::NetAddr and LANInterface::NetMask for any LANInterface instance such that LANInterface::OwnerId equals Device::Id,
      generate the command "network <NET> <WILD> area <A>" where <NET> is <N> bitwise ANDed with <M>, <WILD> is the bitwise inversion of <M>, and <A> is Cisco_device::OSPFArea.
(9) Authorization and accounting configuration:
   (a) Let R be the set of RadiusServer entities.
   (b) if R is not empty, generate the commands "aaa new-model", "aaa authentication login default line", "aaa authentication login h323 radius".
   (c) if R is not empty and Gateway::EnableCallAcct is true, generate the command "aaa-accounting connection h323 stop-only radius".
   (d) for each RadiusServer in R, generate the command "radius-server host <N> auth-port <P> acct-port <A>" where <N> is the RadiusServer's Network_device::NetAddr, <P> is RadiusServer::AuthPort, and <A> is RadiusServer::AcctPort when Gateway::Role is not "VoIP LD" and RadiusServer::AltAcctPort when Gateway::Role equals "VoIP LD".
   (e) if R is not empty, generate the commands "radius-server key <KEY>", where <KEY> is a private security token string, "ip radius source-interface Loopback0", and "gw-accounting h323".
(10) Invoke the generic Cisco_device Final Configuration Procedure on the Gateway instance, described below.

Controller Configuration Procedure:
(1) Generate the command "controller T1 <P>", where <P> is the LineInterface::Port.
(2) Let LG be the LineGroup instance where LineGroup::Id equals LineInterface::LineGroupId.
(3) Generate the command "framing <token>", where <token> is an IOS framing token corresponding to the value of LG::Framing, e.g., "esf", "sf", "crc4", etc.
(4) If this is the LineInterface with the lowest value of LineInterface::port on this gateway instance, generate the command "clock source line primary". If this is the LineInterface with the second lowest value of LineInterface::port on this gateway instance, generate the command "clock source line secondary". Otherwise, generate the command "clock source internal".
(5) Generate the command "linecode <token>", where <token> is an IOS linecode token corresponding to the value of LG::LineCode,
(6) If LG::Type is "ISDN PRI", generate the command "pri-group timeslots 1–24".
(7) If LG::Type is "T1 CAS" generate the command "cas-group 0 timeslots 1–24 type <type><attr>".
   The token <type> is the IOS CAS Type token corresponding to the value of LG::CASType, e.g., "e&m-fgb", "fxs-loop-start".
   The token <attr> is the IOS CAS Attribute token corresponding to the value of LG::CASAttr, e.g., "mf ani-dnis", "dtmf dnis".
(8) Generate the command "voice-port <N>:<C>", where <N> is equal to LineInterface::Port and <C> is "D" when LG.Type is "ISDN PR" and <C> is "0" when LG.Type is "T1 CAS".
(9) Generate the commands "input gain 3", "echo-cancel enable", and "echo-cancel coverage 32".

Standard POTS DialPeer Configuration Procedure
(1) Let L be the set of LineInterface instances where LineInterface::OwnerId equals Device::Id.
(2) For each LineInterface in L such that the associated LineGroup::Direction implies outbound dialing:
   (a) If the Gateway::Role is "Fax", create a POTS dial-peer for port LineInterface::Port with destination pattern "1#1 . . . . . . . . . . . . .".
   (b) If the Gateway::Role is "UM", create a POTS dial-peer for port LineInterface::Port with destination pattern "2#1 . . . . . . . . . . . . .".
   (c) If the Gateway::Role is "UM", create a POTS dial-peer for port LineInterface::Port with destination pattern "3#1 . . . . . . . . . . . . .".
   (d) If the Gateway::Role is "ICM", create a POTS dial-peer for port LineInterface::Port with destination pattern "4#1 . . . . . . . . . . . . .".
   (e) If the Gateway::Role is "PSTN", "PSTN LD", "VoIP LD", or "VoIP CP", generate POTS dial-peers for port LineInterface::Port with destination pattern "<SIC>#<NPA><dotstring>", where <SIC> successively takes on values from the set {99, 98, 97}, <NPA> takes on values from the set of NPAs represented in the LineGroup::OutboundNPA attribute associated with the LineInterface, and <dotstring> is a string of "." characters sufficient to pad the pattern out to 10 characters following the "#". If there are no NPAs in the LineGroup::OutboundNPA list, then a single dial-peer is generated for each <SIC> value with " . . . . . . . " following the "#".
   (f) If the Gateway::Role is "PSTN LD" or "VoIP LD", generate POTS dial-peers for port LineInterface::Port with destination pattern "<SIC>#<NPA><dotstring>", where <SIC> successively takes on values from the set {89, 88, 87}, <NPA> takes on values from the set of NPAs represented in the LineGroup::OutboundNPA attribute associated with the LineInterface, and <dotstring> is a string of "." characters sufficient to pad the pattern out to 10 characters following the "#". If there are no NPAs in the LineGroup::OutboundNPA list, then a single dial-peer is generated for each <SIC> value with " . . . . . . . . ." following the "#".

(3) For each LineInterface in L such that the associated LineGroup::Direction implies inbound dialing:

(a) generate POTS dialpeers for port LineInterface::Port with incoming called-number of "<N> . . . . . . . . . " and specifying direct-inward-dial, where <N> takes on the values {2,3,4,5,6,7,8,9}.

Standard VoIP DialPeer Configuration Procedure:

Unless otherwise specified, all VoIP dial-peers are created with "session-target ras" and "ip precedence 1".

(1) If Gateway::EnableAllCall is true, or Gateway::Role implies an application server front-end gateway:

(a) generate VoIP dial-peers with preference 9, destination patterns "<N> . . . . . . .", tech-prefix string <P>, and codec <C>, where <N> takes on the values {2,3,4,5,6,7,8,9}, and <P> and <C> are
  i. "99#" and "g71 lulaw" if Gateway::Role implies an application server front-end gateway.
  ii. "98#" and "g728r8" if Gateway::Role is "PSTN".

(b) if Gateway::Role implies an application front-end gateway, generate VoIP dial-peers with preference 10, destination patterns "<N> . . . . . . . . . . . .", tech-prefix string "89#", and codec "g711ulaw" where <N> takes on the values {2,3,4,5,6,7,8,9}.

(2) If Gateway::Role is "Fax", generate a VoIP dial-peer with incoming called-number "1#1 . . . . . . . . . . . ." and codec "g711ulaw".

(3) If Gateway::Role is "UM", generate a VoIP dial-peer with incoming called-number "2#1 . . . . . . . . . . . ." and codec "g711ulaw".

(4) If Gateway::Role is "UM", generate a VoIP dial-peer with incoming called-number "3#1 . . . . . . . . . . . ." and codec "g729r8".

(5) If Gateway::Role is "ICM", generate a VoIP dial-peer with incoming called-number "4#1 . . . . . . . . . . . ." and codec "g711ulaw".

(6) If Gateway::Role is "PSTN", "PSTN LD", "VoIP LD", or "VoIP CP", generate VoIP dial-peers with incoming called-number of "<SIC> . . . ", and codec <C> where <SIC> and <C> take on successive values ("99#", "g711ulaw"), ("98#", "g728r8"), ("97#", "g723r63"), and (" ", "g723r63").

(7) If Gateway::Role is "PSTN LD" or "VoIP LD", generate VoIP dial-peers with incoming called-number of "<SIC> . . . . . . . . . . . . . .", and codec <C> where <SIC> and <C> take on successive values ("89#", "g711ulaw"), ("88#", "g728r8"), and ("87#", "g723r63").

NumberBlock DialPeer Configuration Procedure:

Unless specified otherwise, all VoIP dial-peers are generated with "session-target ras" and "ip precedence 1".

(1) Let BASE be a telephone number constructed by concatenating NumberBlock::E164Pfx with the string obtained by left-padding NumberBlock::StartingSuffix with '0' digits until the string is NumberBlock::NumDigitSuffix in length.

(2) If NumberBlock::ReservationType is "No Reservation", let START be equal to BASE. If NumberBlock::ReservationType is "Small Reservation", let START be equal to BASE+20. If NumberBlock::ReservationType is "Standard Reservation", let START be equal to BASE+50.

(3) Let A be the set of NumAssign entities such that NumAssign::NBId equals either 0 or NumberBlock::Id.

(4) For each NumAssign in A, if NumAssign::Offset is less than START:

(a) if NumAssign::AppType is "Fax Redialer", generate a VoIP dial-peer with destination-pattern of BASE+NumAssign::Offset, tech-prefix of "1#1", and codec "g711ulaw".

(b) If NumAssign::AppType is "Fax Redialer", generate one POTS dial-peer for each active voice port associated with a LineInterface whose LineGroup direction implies inbound dialing (see the controller configuration procedure), such dial-peers to have an incoming called-number of BASE+NumAssign::Offset, application "fax_hop_on_1", direct-inward-dial, and port corresponding to the voice port.

(c) if NumAssign::AppType is "UM Deposit", generate a VoIP dial-peer with destination-pattern of BASE+NumAssign::Offset, tech-prefix of "2#1", and codec "g711ulaw".

(d) if NumAssign::AppType is "UM Retrieve", generate a VoIP dial-peer with destination-pattern of BASE+NumAssign::Offset, tech-prefix of "3#1", and codec "g729r8".

(e) if NumAssign::AppType is "ICM", generate a VoIP dial-peer with destination-pattern of BASE+NumAssign::Offset, tech-prefix of "4#1", and codec "g711ulaw".

(5) Let END be a telephone number constructed by concatenating NumberBlock::E164Pfx with the string obtained by left-padding NumberBlock::EndingSuffix with '0' digits until the string is NumberBlock::NumDigitSuffix in length.

(6) If NumberBlock::AppType is not "None", let P be any set of pattern strings of the form "<PFX><dotstring>", where <PFX> is a prefix substring of START including at least NumberBlock::E164Pfx, and <dotstring> is a string of zero or more "." characters padding the pattern out to 10 characters. Let each pattern string denote a set of numbers where each "." in the string can take on the digit values from 0 to 9. The set P is further constrained to be any set of pattern strings meeting the following constraints:

(a) Let N be the set of all 10-digit phone numbers denoted by some pattern in P.

(b) All numbers between START and END inclusive must be members of N.

(c) No numbers between the START and END values of any any other NumberBlock whose AppType differs from this NumberBlock::AppType may be members of N.

For each pattern <p> in P, generate a VoIP dial-peer with destination-pattern <p>, tech-prefix <T>, and codec <C> where <T> and <C> take on the values:

(a) "1#1" and "g711ulaw" if NumberBlock::AppType is "Fax Inbox".

(b) "2#1" and "g711ulaw" if NumberBlock::AppType is "UM Deposit".

Gatekeeper Configuration Procedure:

(1) Invoke the generic Cisco_device Initial Configuration Procedure on the Gatekeeper instance, described below.

(2) Let <ADMIN> be an internet address determined by the following procedure:

(a) If there exists LANInterface entities such that LANInterface::OwnerID equals Device::Id and LANInterface::Type is "FastEthernet", <ADMIN> is the LANInterface::NetAddr for the interface with the lowest Port for the lowest Slot for the lowest Adapter.

(b) Otherwise If there exists LANInterface entities such that LANInterface::OwnerID equals Device::Id and LANInterface::Type is "Ethernet", <ADMIN> is the LANInterface::NetAddr for the interface with the lowest Port for the lowest Slot for the lowest Adapter.

(c) Otherwise, <ADMIN> is Network_device::NetAddr.

(3) For each LANInterface instance such that LANInterface::OwnerId equals Device::Id:

(a) generate the command "interface <Type><Slot>/<Port>" where <Type> is LANInterface::Type, <Slot> is LANInterface::Slot, and <Port> is LANInterface::Port.

(b) generate the command "ip address <N> <M>" where <N> is LANInterface::NetAddr and <M> is LANInterface::NetMask.

(c) generate the command "no ip directed-broadcast"

(d) generate the command "no shutdown"

(e) if LANInterface::NetAddr equals <ADMIN> and Gatekeeper::HSRPRole is not "None", generate the commands "no ip redirects", "standby <G> priority <P>", "standby <G> preempt", and "standby <G> ip <N>", where <G> is Gatekeeper::HSRPGroup, <P> is 110 if Gatekeeper::HSRPType is "Primary" and 101 if Gatekeeper::HSRPType is "Secondary", and <N> is Network_device::NetAddr.

(4) Generate the commands "ip classless" and "ip route 0.0.0.0 0.0.0.0 <N>", where <N> is Gatekeeper::DefRouter.

(5) Let LZ be the set of LocalZone instances where LocalZone::GatekeeperId equals Device::Id. For each LocalZone in LZ, with the instance having LocalZone::SubZone equal to false processed first:

(a) generate the command "zone local <Z> <D> <N>" where <Z> is LocalZone::ZoneName, <D> is the portion of Network_device::HostName following the first ".", and <N> is Network_device::NetAddr.

(b) generate the command "zone access <Z> default direct", where <Z> is LocalZone::ZoneName.

(6) Let RZ be the set of LocalZone instances defined as follows. If Gatekeeper::Role is "LD" or "VoIP LD", RZ is the empty set. If Gatekeeper::Role is "POP", RZ is the set of LocalZone instances where LocalZone::GatekeeperId is not Device::Id and LocalZone::SubZone is false. If Gatekeeper::Role is "DC", RZ is the set of LocalZone instances where LocalZone::GatekeeperId is not Device::Id and LocalZone::SubZone is false and the "other" Gatekeeper instance whose Device::Id equals LocalZone::GatekeeperId have a Gatekeeper::Role that is not "DC".

For each LocalZone in RZ:

(a) let RGK be the Gatekeeper instance where Device::Id equals LocalZone::GatekeeperId.

(b) generate the command "zone remote <Z> <D> <N> 1719" where <Z> is LocalZone::ZoneName, <D> is the portion of Network_device::HostName for RGK following the first "." character, and <N> is Network_device::NetAddr for RGK.

(7) Zone Prefix configuration:

(a) Let ZP be a set of pairs (Name, E164), initially empty.

(b) For each LocalZone in LZ and each E.164 prefix in the comma-separated list of prefixes in LocalZone::PrefixList, add a pair (LocalZone::ZoneName, E.164 prefix) to ZP.

(c) For each LocalZone in RZ, let RLZ be the set of LocalZone instances where RLZ's LocalZone::GatekeeperId equals RZ's LocalZone::GatekeeperId and RLZ's LocalZone::SubZone is true.

(d) For each LocalZone in RLZ and each E.164 prefix in the comma-separated list of prefixes in LocalZone::PrefixList, add a pair (<Z>, <P>) to ZP where <Z> is the LocalZone::ZoneName for the instance in RZ where LocalZone::GatekeeperId equals the LocalZone::GatekeeperId of the instance in RLZ, and <P> is the E.164 prefix.

(e) Remove from ZP any pair (Z1, P1) for which there exists another pair (Z2, P2) in ZP such that Z 1 equals Z2 and P2 is a prefix substring of P1.

(f) For each pair (<Z>, <P>) in ZP, generate the command "zone prefix <Z> <P>".

(8) Type prefix configuration:

(a) generate the commands "gw-type-prefix 99#*", "gw-type-prefix 98#*" and "gw-type-prefix 97#*".

(b) if Gatekeeper::Role is "LD" or "VoIP LD", generate the commands "gw-type-prefix 89#*", "gw-type-prefix 88#*" and "gw-type-prefix 87#*".

(9) For each instance of HopOffZone such that HopOffZone::GatekeeperId equals Device:: Id:

(a) generate the command "gw-type-prefix <P>#* hopoff <Z>" where <Z> is HopOffZone::ZoneName, and <P> is "1" if HopOffZone::AppType is "Fax Inbox", "2" if HopOffZone::AppType is "UM Deposit", "3" if HopOffZone::AppType is "UM Retrieve", or "4" if HopOffZone::AppType is "ICM".

(b) if Gatekeeper::Role is not "LD" or "VoIP LD", generate the commands "gw-type-prefix 89#* hopoff<Z>" and "gw-type-prefix 88#* hopoff <Z>" where <Z> is LocalZone::ZoneName for some LocalZone LZ where there exists a Gatekeeper GK such that GK's Gatekeeper::Role is "LD" and GK's Device::Id equals LZ's LocalZone::GatekeeperId and LZ's LocalZone::SubZone is false.

(10) Invoke the generic Cisco_device Final Configuration Procedure on the Gatekeeper table 101, described below.

Cisco_device Initial Configuration Procedure (1) generate a "hostname <token>" command, where <token> is that portion of the Network_device::HostName attribute before the first "." character, if any.

(2) generate a "boot system flash" command.

(3) generate an "enable secret <token>" command, where <token> is the Cisco device::EnablePassword string.

Cisco-Device Final Configuration Procedure (1) If Device::LocationType references a POP, let <location> refer to the POP instance where POP::Id is Device::LocationId. Otherwise, let <location> refer to the Datacenter instance where Datacenter::Id is Device::LocationId. Let <locname> refer to <location>::Name, <contact> refer to <location>::Contact, <nameservers> refer to <location>::NameServers, <timeservers> refer to <location>::NTPServers (2) Generate the command "snmp-server community <token>" where <token> is SNMP_client::Community.

(3) Generate the command "snmp-server location <locname>" where <locname> has the value determined in (1).

(4) Generate the command "snmp-server contact <contact>", where <contact> has the value determined in (1).

(5) Let <servers> be the comma-separated list of internet addresses obtained from NOC::SNMP_servers attribute of the single NOC instance.

(6) If the <servers> list is not empty, generate the command "snmp-server enable traps snmp".

(7) For each internet address <netaddr> in the <servers> list, generate the command "snmp-server host <netaddr> <community>", where <community> is SNMP_client::Community.

(8) Let <domain> be the portion of Network_device::HostName following the first "." character. Generate the command "ip domain-name <domain>".

(9) Consider the <nameservers> attribute obtained as described in (1) to be a comma-separated list of internet addresses. For each internet address <netaddr> in the <nameservers> list, generate the command "ip name-server <netaddr>".

(10) Consider the <timeservers> attribute obtained as described in (1) to be a comma-separated list of internet addresses. For each internet address <netaddr> in the <timeservers> list, generate the command "ntp server <netaddr>".

(11) If the <timeservers> list is not empty, generate the command "ntp source <interface-name>", where <interface-name> is the the IOS interface name selected a follows. If a loopback interface is defined, the lowest numbered loopback interface is used. If a FastEthernet interface is defined, the one with the lowest port number for the lowest slot number for the lowest adapter number is used. Otherwise, use the Ethernet interface with the lowest port number for the lowest slot number for the lowest adapter number.

(11) For each AccessControl instance in the database, generate the command "access-list <class> permit <netaddr> <wildmask>" where <class> is AccessControl::Class, <netaddr> is AccessControl::NetAddr, and <wildmask> is AccessControl::WildMask.

(12) Generate the commands "line con 0", "password <password>", "login", and "exec-timeout 90 0".

(13) Generate the command "line aux 0".

(14) Generate the commands "line vty 0 4", "password <password>", "login", "exec-timeout 90 0", and "authentication default".

If there are any AccessControl instances, generate the command "access-class <class> in", where <class> is the lowest AccessControl::Class value of any instance.

The foregoing data model may be utilized by a configuration management toolset provided by COMIT. The configuration management toolset allows the H.323 network to be viewed and managed as a single entity rather than as a disparate collection of independent devices. The toolset automates the generation, installation, auditing, and updating of the complete device configurations for the gateways and gatekeepers. The configuration of these devices may be defined by a text file that is read at device boot time and subsequently altered by logging in to the device (via telnet or a console interface) and issuing configuration commands directly to the command line interface (CLI). Details of the device's operation is controlled by the configuration file, including the definition of network interfaces, such as LANs, wide-area networks, and loopbacks, the routing model, such as open shortest-path first (OSPF), network services, such as telnet, ntp, snmp, syslog, and radius, the physical telephony interfaces (T1) and associated protocols, such as ISDN, and channel associated signaling (CAS), and the H.323 configuration.

Although some aspects of the configurations are invariant from one gateway or gatekeeper to the next, most configuration elements are directly transcribed or computed from object attributes in the data model. Two examples of H.323 configurations are the two that apply to a gateway 12 and a gatekeeper.

For an H.323 configuration of a gateway, a set of dial-peer specifications may be included that define the handling of phone calls entering and leaving both via the PSTN and over the Internet. Outbound PSTN dial-peers control which area codes can be outdialed from which PRI lines, and this information is obtained by consulting the trunk group object associated with each PRI interface. Outbound IP dial-peers specify the routing of individual access numbers; with the current set of services, six or more dial-peers may be used for each access number block handled by the gateway. Because many PRIs belonging to a trunk group may connect to many different gateways, a single set of access number and trunk group objects may contribute to the configurations of many gateways.

For an H.323 configuration of a gatekeeper, the mapping of area codes to outdial zones and the mapping of outdial zones to gatekeepers may be implemented. The data model records the set of outdial zones that are local to each gatekeeper, along with their associated area codes. When generating the configuration for a given gatekeeper, all of its associated outdial zones are declared as local zones, while all of the outdial zones of other gatekeepers are declared as remote zones (which define the IP address of the gatekeeper managing the zone). Adding a new local zone to one gatekeeper may automatically cause the generation of remote zone definitions on the other gatekeepers.

The data model may have to undergo periodic modifications. For this purpose, COMIT helps translate the data model changes into device configuration changes and distribute the changes to the appropriate devices.

COMIT may also provide a configuration auditing tool that automatically decides which devices require configuration updates. This tool visits gateways and gatekeepers in the network on a regular basis, uploads its current configuration, compares it against the data model, and generates a report of the devices that require updates. In addition, the same tool can be instructed to automatically connect to the affected devices and enter configuration changes via the command line interface to bring the device into conformity with the data model without rebooting it. Both the audit and update functions can also be performed on selected devices through a graphical user interface.

A web-based graphical user interface may be used to serve as the primary user interface for COMIT. The interface provides a framework for browsing the data model contents, adding or modifying data and devices, generating reports, and running applications. In one embodiment, HTTP is used as the interface delivery mechanism because it allows the interface to be accessed from a wide variety of client platforms without the need for building and distributing client-specific applications. The implementation may use Perl 5 with CGI and database support extensions, which may utilize a framework for accessing the COMIT database that parallels the C++ library. In another embodiment, the C++ and Perl libraries may be replaced with a single Java implementation to improve portability and minimize redundancies in the development effort.

In one embodiment, a user name and password are requested before the user gains access to the interface. Logins and data modifications may be recorded in a log file, and modifications may be subjected to consistency checking. Users are assigned specific roles in the system that limit the kinds of data they can see and manipulate as well as the reports and applications they can run. For example, read-only users can only browse non-security related information in the database and run a limited set of reports, while network engineers can modify network interface definitions and device passwords as well as manage device configurations.

An automated call testing tool may be used to qualify PSTN circuits and number block routing prior to placing them into production use. The types of testing performed include isolation of in-calls to individual PRI lines in a trunk group, initiation of calls to all access numbers to direct them to the correct trunk groups, verification that in-calls are connected to the correct application services, and verification of outdial coverage in a given service region. Tests may be run on-demand or scheduled for off-hours execution.

In one example of an embodiment of in-call testing, a test may specify that all access numbers routed to a particular trunk group be tested, and that each PRI line in the trunk group be tested in turn to verify that it is receiving calls. The tool uses COMIT to identify the H.323 gateways, PRI lines, and access numbers associated with the trunk group. At the start of the test run, the tool selects one of the PRI lines to test and connects to all gateways associated with the trunk group to turn off the PRI lines that are not to yet to be checked. The tool then turns on debugging output on the gateway for the PRI under test and begins parsing the debugging messages to identify incoming test calls. Once this initialization has been completed, the tool tests access numbers by placing many calls in parallel using a modem bank. Calls may be placed either via a long distance carrier or over the H.323 network, as desired. The tool keeps track of which calls were placed and which calls were received for later reporting. Once the complete set of numbers has been called, the tool then resets to direct calls to the next PRI line in the trunk group and runs the in-call test again.

Out-call coverage testing is performed in a manner similar to in-call testing, except that calls are directed from within the H.323 quality of service network to real phone numbers in the PSTN to verify that the local carrier is providing service to the contracted region. COMIT maintains a list of test numbers representing a set of rate centers in service areas. The call testing tool takes a list of area codes, and then begins a series of calls (using many modems in parallel) to all the test numbers in the given area codes. The result of each call may then be recorded for later analysis.

When an area code splits, a portion of the exchanges in the area code is reassigned to a new area code. This may be referred to as exchange renaming. There may be two dates associated with a split: the permissive date and the mandatory date. On the permissive date, phone numbers in the new area code may be successfully dialed but the old area code remains active. On the mandatory date, the old area code for the renamed exchanges may not be dialed so the new area code is used. The time between these two dates may be referred to as the permissive period.

Phone numbers in COMIT and the various application server databases that are affected by a split may have to be renamed to the new area code by the mandatory date to avoid a service failure. During the permissive period, on the other hand, the PoP gateways and the application servers may have to be able to recognize numbers with both the old and new area code as synonyms for each other because the local carrier's switch may provide the numbers with either NPA during the permissive period. Finally, the gateways and gatekeepers may be altered to recognize and properly route calls to the new area code on the permissive date.

COMIT maintains a table of exchange renamings (with the associated permissive and mandatory dates) for use in area code split management. The information in this table is provided to the application service platforms and the customer provisioning systems to enable them to update their databases at the appropriate times. In addition, the configuration management system uses this table to determine which access numbers are within the permissive period of an exchange renaming and therefore may require duplicate dial-peers for both the old and new area codes. Whenever a permissive date arrives, the configuration management system automatically identifies all of the affected gateways and gatekeepers and updates their configurations accordingly.

COMIT may also play a major role in many other applications not listed above. For example, since COMIT may posses a detailed representation of the multiservice network, it may be used to populate other operational databases, such as network monitoring system maps and a network element resource tracking system. COMIT may also be used as a source of data for a suite of fault impact analysis tools that map a given set of circuit or system failures to the set of affected service regions and customers, including an assessment of the extent of service degradation to the affected areas. The order entry and account provisioning systems for the various applications may use COMIT to discover the collection of access numbers that can be assigned to customers and determine which access numbers are within a customer's local calling area. The traffic analysis system uses COMIT to correlate detailed traffic statistics with particular application services. Finally, COMIT may provide a tool that automatically distributes and installs new operation system releases in the multiservice network.

In accordance with the system described herein, a multiservice network includes a data center that provides one or several applications services. Such services include IP-based faxing, IP telephony, and conferencing, as well as Internet call waiting and messaging services. These services may then serve as a bridge between the Internet and the telephone network. The services that may be offered share the common trait of utilizing telephone services and fax machines on the one hand, and PC or other IP devices, on the other.

A multiservice network connects to a nationwide array of telephone company switches, and permits calls from telephone networks to a gateway 12. The gateways 12 convert the circuit voice signal to IP packets, a procedure known to those in the art as VoIP. The gateways 12 can also convert an incoming fax to IP packets, a procedure known to those in the art as FoIP. Calls may arrive at one of several gateways 12 which act as bridges connecting the telephone system and IP networks, and that help convert voice and fax data to packets. A dedicated national network may then bring all relevant voice and fax IP traffic back to data centers 22. Voice or fax traffic can also be sent from the PSTN to an ingress gateway, which converts the signal to IP packets. The packets may then be sent over the IP network to an egress gateway, which converts the packets back to 64 kbps DS0 channels and delivers these to the PSTN 11. VoIP entails that the circuit switch, 64 kb/s data traffic come over a gateway, which, in one embodiment, is of the type built and made widely available by Cisco Systems, Inc. The gateway captures the voice stream and may compress it, for example, using voice coding techniques, such as G.729 or G.723. These types of gateways, which are examples of "codecs" or coders/decoders, convert data to IP packets breaking up the data to frames using an Internet protocol. The packets may then be carried to various destinations along appropriate data networks that carry IP traffic.

In one embodiment, a network may be dedicated to the high quality transmission of IP packets. Such dedicated networks ensure that the IP packets encounter few delays in transit. Such a high quality IP telecom service may be made available to various commercial enterprises. In a preferred embodiment, this telecom service may utilize optical fibers that can carry up to 10 Gigabits per second (for example, SONET OC-192), such as the telecom service built by GTE™. Such a large bandwidth may be divided up into smaller segments, or circuits, such as OC-3, OC-12, or DS3, that may be made available to different users. In other embodiments, the network may be the public Internet, or a part of the public Internet providing QoS (quality of service) guarantees.

While the invention has been disclosed with the preferred embodiments shown and described in detail, various modifications and improvements thereon will become readily apparent to those skilled in the art. For example, although in the data models tables have been used to facilitate the storage and management of data, other types of relations could instead be used. Accordingly, the spirit and scope of the present invention are to be limited only by the following claims.

The invention claimed is:

1. A multiservice network comprising:
  a) a wide-area IP network;
  b) a public switched telephone network;
  c) a data center, connected to the public switched telephone network, and the wide-area IP network, that manages and provides services to the multiservice network; and
  d) a configuration manager for Internet telephony for managing the multiservice network including a data model having:
    i) a hierarchy of tables for each class of device of the multiservice network; and
    ii) attributes associated with each device collected from levels in the hierarchy and representing data for the multiservice network.

2. A multiservice network as in claim 1, wherein the data center further includes a server for the configuration manager for Internet telephony to process information using the data model.

3. A multiservice network comprising:
  a) a wide-area IP network;
  b) a public switched telephone network;
  c) a point-of-presence including:
    i) a gateway to interface with the public switched telephone network;
    ii) an IP router to interface with the wide-area IP network; and
    iii) a local area network that interconnects the gateway and router;
  d) a data center, connected to the public switched telephone network, and the wide-area IP network, that manages and provides services to the multiservice network, said data center including at least one application server,
  e) a signaling system to process information elements between the public switched telephone network and at least one of an application server, a gateway, and an IP client, the signaling system including:
    i) a first system to associate a direct inward dialing number with a type of service;
    ii) a second system to identify the type of service by a code;
    iii) a third system having at least one of a gatekeeper and a call agent to determine a destination IP address associated with the code; and
    iv) a fourth system to transfer the information element via the wide-area IP network to at least one of the gateway, the application server, and the IP client; and
  f) a configuration manager for Internet telephony for managing the multiservice network including:
    i) means for configuring the multiservice network;
    ii) means for monitoring and testing the multiservice network; and
    iii) means for providing assignments of numbers of the public switched telephone network.

4. A multiservice network as in claim 3, wherein the wide-area IP network includes at least one of IP over SONET dedicated lines, IP over DS3 dedicated lines, and ATM circuits.

5. A multiservice network as in claim 3, wherein the wide-area IP network is shared by both multiservice network related packets and other data packets.

6. The multiservice network of claim 5, wherein a transit delay, jitter and loss of said multiservice network related packets are guaranteed to meet predetermined tolerances.

7. A multiservice network as in claim 3, wherein the gateway and the public switched telephone network are connected via a public switched telephone network interface.

8. The multiservice network of claim 7, wherein the public switched telephone network interface is one of a T1 carrier connection, a PRI connect, a channelized T3 connection and an Intermachine T 1 Trunk.

9. A multiservice network as in claim 3, wherein the local area network is at least one of a switched Ethernet, a fast Ethernet, and a gigabit Ethernet.

10. A multiservice network as in claim 3, wherein managing and providing services includes at least one of accounting, authorization, authentication, billing, and traffic monitoring.

11. A multiservice network as in claim 3, wherein the data center is connected to a public Internet.

12. A multiservice network as in claim 3, wherein the data center includes a data base and control equipment.

13. A multiservice network as in claim 3, wherein the data center includes an application server.

14. A multiservice network as in claim 13, further comprising a call control agent for determining an IP destination address of the application server for depositing an inbound data transmission.

15. The multiservice network of claim 14, wherein the inbound data transmission is one of a facsimile, a voice message and a TTY message.

16. A multiservice network as in claim 13, wherein the application server includes at least one of a fax server, messaging server, conferencing server, voice-over-IP server, and Internet call waiting server.

17. A multiservice network as in claim 13, wherein the application server is connected to the public switched telephone network through small intermediary circuit switches.

18. A multiservice network as in claim 13, wherein the gateway is a first gateway and the application server is connected to the public switched telephone network through a second gateway.

19. The multiservice network of claim 13, wherein the gateway is a first gateway and the application server is connected to the wide-area IP network by a second gateway.

20. A multiservice network as in claim 3, wherein the public switched telephone network transmits signaling information to the wide-area IP network via one of an ISDN D-channel, channel associated signaling, and an SS7 gateway.

21. A multiservice network as in claim 20, wherein signaling information includes at least one of DNIS, ANI, RDN, OCN, and CNAM information.

22. A multiservice network as in claim 3, further comprising a call control agent for determining a destination IP address of a network element to terminate an inbound call.

23. A multiservice network as in claim 3, further comprising a call control agent for determining an IP destination address for a subscriber.

24. A multiservice network as in claim 3, further comprising a call control agent for determining an E.164 destination address for a subscriber.

25. A multiservice network as in claim 3, further comprising a call control agent for authenticating an account number or a password of a caller.

26. A multiservice network, comprising:
a) a wide-area IP network;
b) a public switched telephone network;
c) a point-of-presence including:
  i) a gateway to interface with the public switched telephone network;
  ii) an IP router to interface with the wide-area IP network; and
  iii) a local area network that interconnects the gateway and router;
d) a data center, connected to the public switched telephone network, and the wide-area IP network, that manages and provides services to the multiservice network, said data center including at least one application server;
e) a signaling system to process information elements between the public switched telephone network and at least one of an application server, a gateway, and an IP client, the signaling system including:
  i) a first system to associate a direct inward dialing number with a type of service;
  ii) a second system to identify the type of service by a code;
  iii) a third system having at least one of a gatekeeper and a call agent to determine a destination IP address associated with the code; and
  iv) a fourth system to transfer the information element via the wide-area IP network to at least one of the gateway, the application server, and the IP client;
f) a configuration manager for Internet telephony for managing the multiservice network; and
g) a signaling gateway which exchanges signaling information with an SS7 system, said SS7 system being connected to the wide-area IP network via the signaling gateway.

27. A multiservice network as in claim 26, wherein signaling information includes at least one of DNIS, ANI, RDN, OCN, and CNAM information.

28. A method for providing communication services over a multiservice network comprising:

a) connecting a wide-area IP network to a public switched telephone network by using at least one point-of-presence having:
  i) a gateway to interface with the public switched telephone network;
  ii) an IP router to interface with the wide-area IP network; and
  iii) a local area network that interconnects the gateway and router;
b) connecting a data center to the public switched telephone network, and the wide-area IP network, said data center including an application server;
c) providing services to the multiservice network by using the data center;
d) providing a signaling system, including:
  i) capturing an information element from the public switched telephone network;
  ii) associating a direct inward dialing number with a type of service;
  iii) identifying the type of service with a code;
  iv) determining a destination IP address based on the code using at least one of a gatekeeper and call agent;
  v) passing the information element across the wide-area IP network to at least one of the gateway, the application server, and an IP client; and
  vi) signaling for at least one of a telephone call and a fax call originating from the application server and terminating at at least one of the gateway and IP client; and
e) managing the multiservice network with a configuration manager for Internet telephony.

29. A method for providing communication services over a multiservice network as in claim 28, further comprising sharing the wide-area IP network with both data packets of the multiservice network and other data packets.

30. The method of claim 29 further comprising guaranteeing that transit delay, jitter and loss of said data packets of the multiservice network meet predetermined tolerances.

31. A method for providing communication services over a multiservice network as in claim 28, further comprising connecting the gateway and the public switched telephone network via a public switched telephone network interface.

32. The method of claim 31, wherein the public switched telephone network interface is one of a T1 carrier connection, a PRI connection, a channelized T3 connection and an Intermachine T1 Trunk.

33. A method for providing communication services over a multiservice network as in claim 28, wherein managing the multiservice network with the data center and providing services to the multiservice network by using the data center includes at least one of accounting, authorizing, authenticating, billing, and traffic monitoring.

34. A method for providing communication services over a multiservice network as in claim 28, wherein connecting a data center to the public switched telephone network, and the wide-area IP network includes connecting a data center having an application server.

35. A method for providing communication services over a multiservice network as in claim 28, further comprising transmitting signaling information from the public switched telephone network to the wide-area IP network via one of an ISDN D-channel, channel associated signaling, and an SS7-IP gateway.

36. A method for providing communication services over a multiservice network as in claim 35, wherein transmitting signaling information includes transmitting at least one of DNIS, ANI, RDN, OCN, and CNAM information.

37. A method for providing communication services over a multiservice network as in claim 28, further comprising determining a destination IP address of a network element to terminate an inbound call by using a call control agent in the data center.

38. A method for providing communication services over a multiservice network as in claim 28, further comprising determining an IP destination address for a subscriber by using a call control agent in the data center.

39. A method for providing communication services over a multiservice network as in claim 28, further comprising determining an E.164 destination address for a subscriber by using a call control agent in the data center.

40. A method for providing communication services over a multiservice network as in claim 28, further comprising authenticating an account number or a password of a caller by using a call control agent in the data center.

41. A method for providing communication services over a multiservice network as in claim 28, further comprising determining an IP destination address of the application server for depositing an inbound data transmission.

42. The method of claim 41, wherein the inbound data transmission is one of a facsimile, voice message, or TTY message.

43. A method for providing communication services over a multiservice network as in claim 28, wherein managing the multiservice network with a configuration manager for Internet telephony includes:
 a) configuring the multiservice network to direct the routing of calls;
 b) performing monitoring and testing of the multiservice network; and
 c) providing assignments of numbers of the public switched telephone network.

44. A method for providing communication services over a multiservice network as in claim 28, wherein managing the multiservice network comprises:
 a) defining relations in a data model to model data pertaining to the multiservice network;
 b) associating attributes with the relations to represent data for network elements of the multiservice network; and
 c) downloading information from the data model to the network elements of the multiservice network to manage the multiservice network.

45. A computer-readable medium containing a data model for configuring items in a multiservice network comprising:
 one or more entities corresponding to tables used to represent classes of items included in said multiservice network, first aspects of the tables corresponding to specific instances of the classes and second aspects of the tables corresponding to at least one of relationships between entities, and values corresponding to attributes associated with specific items included in said multiservice network, said second aspects serving as pointers to entities related to the first aspects when said second aspects correspond to relationships between entities.

46. The data model of claim 45, wherein said items include network elements, a network interface, a public switched telephone network interface, a DID number block, a public switched telephone network phone number exchange, and a public switched telephone network local calling plan.

47. A data model as in claim 46, wherein the network elements include a gateway, a gatekeeper, a router, an Ethernet switch, a softswitch, and an SS7 interface.

* * * * *